US012623536B2

(12) United States Patent
Yang

(10) Patent No.: US 12,623,536 B2
(45) Date of Patent: May 12, 2026

(54) DISCONNECTING DIFFERENTIAL MECHANISMS FOR MOTOR VEHICLES

(71) Applicant: MAGNA POWERTRAIN, INC., Concord (CA)

(72) Inventor: Stephen Yang, Concord (CA)

(73) Assignee: Magna Powertrain, Inc., Aurora (CA)

( * ) Notice: Subject to any disclaimer, the term of this patent is extended or adjusted under 35 U.S.C. 154(b) by 424 days.

(21) Appl. No.: 18/037,623

(22) PCT Filed: Nov. 22, 2021

(86) PCT No.: PCT/CA2021/051654

§ 371 (c)(1),
(2) Date: May 18, 2023

(87) PCT Pub. No.: WO2022/104480

PCT Pub. Date: May 27, 2022

(65) Prior Publication Data

US 2023/0406097 A1 Dec. 21, 2023

Related U.S. Application Data

(60) Provisional application No. 63/156,389, filed on Mar. 4, 2021, provisional application No. 63/116,999, filed on Nov. 23, 2020.

(51) Int. Cl.
*F16H 48/00* (2012.01)
*B60K 1/00* (2006.01)
(Continued)

(52) U.S. Cl.
CPC ................ *B60K 23/08* (2013.01); *B60K 1/00* (2013.01); *B60K 17/354* (2013.01);
(Continued)

(58) Field of Classification Search
CPC ........ B60K 23/08; B60K 1/00; B60K 17/354; B60K 17/356; B60K 2001/001;
(Continued)

(56) References Cited

U.S. PATENT DOCUMENTS 5,695,022 A * 12/1997 Zalewski ........... B60K 23/0808
701/1
6,079,535 A * 6/2000 Mueller ................. B60K 17/34
192/48.8
(Continued)

FOREIGN PATENT DOCUMENTS

DE 102017107217 A1 * 10/2017 ............. F16H 48/40
DE 102017107219 A1 10/2017
JP 2004183874 A 7/2004

OTHER PUBLICATIONS

Canadian Intellectual Property Office, Gatineau, Quebec, Canada, International Search Report of International Application No. PCT/CA2021/051654, Mailed Feb. 14, 2022, 5 pages.

*Primary Examiner* — Zakaria Elahmadi
(74) *Attorney, Agent, or Firm* — Dickinson Wright PLLC

(57) ABSTRACT

The present disclosure is directed to electric vehicles and electric powertrains for such electric vehicles. The electric powertrain in configured to include an electric motor and disconnectable differential assembly arranged for transmitting the motive power generated by the electric motor to a pair of ground-engaging wheels. The disconnectable differential assembly includes a power transfer mechanism driven by the electric motor, a differential mechanism interconnected to the pair of ground-engaging wheels, and a power-operated disconnect mechanism for selectively coupling and uncoupling the power transfer mechanism and the differential mechanism.

19 Claims, 31 Drawing Sheets

(51) Int. Cl.

| | |
|---|---|
| *B60K 17/354* | (2006.01) |
| *B60K 17/356* | (2006.01) |
| *B60K 23/08* | (2006.01) |
| *F16D 27/118* | (2006.01) |
| *F16H 48/08* | (2006.01) |
| *F16H 48/38* | (2012.01) |

(52) U.S. Cl.
CPC .......... *B60K 17/356* (2013.01); *F16D 27/118* (2013.01); *F16H 48/08* (2013.01); *F16H 48/38* (2013.01); *B60K 2001/001* (2013.01); *B60K 2023/0858* (2013.01); *F16D 2500/1022* (2013.01); *F16D 2500/10412* (2013.01)

(58) Field of Classification Search
CPC .......... B60K 2023/0858; F16D 27/118; F16D 2500/1022; F16D 2500/10412; F16H 48/08; F16H 48/38
See application file for complete search history.

(56) References Cited

U.S. PATENT DOCUMENTS

| | | | |
|---|---|---|---|
| 6,481,519 B1* | 11/2002 | Bowen | B60K 6/26 |
| | | | 475/221 |
| 6,551,209 B2 | 4/2003 | Cheadle et al. | |
| 6,626,787 B2 | 9/2003 | Porter | |
| 6,827,661 B2 | 12/2004 | Fusegi et al. | |
| 6,880,664 B2 | 4/2005 | Pecnik et al. | |
| 7,317,295 B2 | 1/2008 | Izumi et al. | |
| 7,383,902 B2 | 6/2008 | Matsuzaki et al. | |
| 8,308,598 B2 | 11/2012 | Pritchard et al. | |
| 8,388,486 B2* | 3/2013 | Ekonen | F16D 48/06 |
| | | | 475/221 |
| 9,033,843 B2 | 5/2015 | Knoblauch et al. | |
| 9,476,460 B2* | 10/2016 | Seidl | F16D 13/46 |
| 9,759,303 B2 | 9/2017 | Peura | |
| 10,233,977 B2 | 3/2019 | Mayr | |
| 10,308,113 B2 | 6/2019 | Inose et al. | |
| 10,415,680 B2 | 9/2019 | Yoshisaka et al. | |
| 11,815,171 B2 | 11/2023 | Aikawa et al. | |
| 2002/0142879 A1 | 10/2002 | Porter | |
| 2007/0179008 A1* | 8/2007 | Fusegi | F16D 13/52 |
| | | | 475/231 |
| 2008/0009381 A1* | 1/2008 | Sudou | F16H 48/08 |
| | | | 475/231 |
| 2008/0015076 A1* | 1/2008 | Fusegi | F16H 48/24 |
| | | | 475/252 |
| 2008/0042791 A1* | 2/2008 | York | F16H 48/24 |
| | | | 335/296 |
| 2008/0122436 A1* | 5/2008 | Pinkos | F16H 48/08 |
| | | | 324/207.21 |
| 2010/0311533 A1 | 12/2010 | Balenda, II et al. | |
| 2013/0303326 A1* | 11/2013 | Downs | B60K 17/346 |
| | | | 475/221 |
| 2015/0354643 A1* | 12/2015 | Ebuchi | F16D 48/064 |
| | | | 192/69 |
| 2016/0152238 A1* | 6/2016 | Mita | B60W 10/06 |
| | | | 180/197 |
| 2017/0130838 A1* | 5/2017 | Imafuku | B60K 23/0808 |
| 2018/0134153 A1 | 5/2018 | Kumar | |
| 2019/0032762 A1* | 1/2019 | Yoshisaka | F16H 48/24 |
| 2019/0309804 A1* | 10/2019 | Shibata | B60K 17/02 |
| 2020/0109753 A1* | 4/2020 | Northrup | F16D 67/02 |
| 2022/0325786 A1* | 10/2022 | Davis | F16H 48/34 |

* cited by examiner

DISCONNECTING DIFFERENTIAL MECHANISMS FOR MOTOR VEHICLES

CROSS-REFERENCE TO RELATED APPLICATIONS

This application is a U.S. National Stage of PCT International Patent Application No. PCT/CA2021/051654, filed on Nov. 22, 2021, which claims the benefit and priority to U.S. Provisional Patent Application Ser. No. 63/116,999, filed on Nov. 23, 2020, and U.S. Provisional Patent Application Ser. No. 63/156,389, filed on Mar. 4, 2021, the entire disclosures of which are incorporated herein by reference.

FIELD

The present disclosure related generally to differential assemblies of the type used in motor vehicles and which are configured to include a power transfer mechanism, a differential mechanism, and a power-operated disconnect mechanism operable for selectively coupling and uncoupling the differential mechanism and the power transfer mechanism. The present disclosure is also directed to electrically-powered drivetrains, such as an electric axle assembly, equipped with such a "disconnectable" differential assembly.

BACKGROUND

This section provides background information related to the present disclosure which is not necessarily prior art.

In view of the recent commitment of most motor vehicle OEM's to development of electric vehicles (EV's), a great deal of engineering activity has been directed to efficiently packaging an electric powertrain for installation into electric vehicles. In many configurations, the electric powertrain is the exclusive or "primary" electric powertrain and is operable for generating and transmitting motive power (i.e., drive torque) to a single pair of wheels, typically the front wheels. However, attention has also been directed to development of EV's having a "secondary" electric powertrain, in addition to the primary electric powertrain, that is operable to generate and transmit motive power to the other pair of wheels, such as the rear wheels, to establish a four-wheel drive (4WD) vehicle. The secondary electric powertrain may include an electric motor driving a differential assembly, packaged as an electric drive axle. When the 4WD mode is not required, it is known to selectively "disconnect" the secondary electric powertrain by uncoupling the differential assembly from the electric motor via a power-operated disconnect device.

Based on the amount of attention currently directed to development of optimized secondary electric powertrains, the structure and functional interaction of the power-operated disconnect device disposed between the electric motor and the differential assembly is important. Accordingly, a need exists to develop "disconnectable' differential assemblies for use in secondary electric powertrain applications that are configured to advance the art.

SUMMARY

This section provides a general summary of the many aspects associated with the inventive concepts embodied in the teachings of the present disclosure and is not intended to be considered a complete listing of its full scope of protection nor all of its features and advantages.

It is an aspect of the present disclosure to provide an electric powertrain having a disconnectable differential assembly which is configured for use in motor vehicle drivetrain and/or driveline applications and which embodies the inventive concepts set forth in the following detailed description and illustrated in the appended drawings.

In accordance with this aspect, the disconnectable differential assembly of the present disclosure is generally associated with an electric powertrain and configured as an electrically-powered transaxle or drive axle of the type used in partially or fully electric vehicles for transmitting motive power (i.e. drive torque) from an electric motor to a pair of ground-engaging wheels.

The disconnectable differential assembly of the present disclosure is configured to generally include a power transfer mechanism driven by the electric motor, a differential mechanism drivingly connected to the ground-engaging wheels, and a power-operated disconnect mechanism operable in a first or "Connected" mode to couple the power transfer mechanism to the differential mechanism and further operable in a second or "Disconnected" mode to uncouple the power transfer mechanism from the differential mechanism.

In the various alternative and non-limiting embodiments of the disconnectable differential assemblies associated with the present disclosure, the power transfer mechanism is configured to include a ring gear adapted to be driven by the electric motor, and an outer housing fixed for common rotation with the ring gear and which together define an internal cavity. In addition, the differential mechanism is rotatably disposed within the internal cavity and includes a differential carrier supporting a differential gearset. Further, the power-operated disconnect mechanism is configured to include a clutch unit disposed between the outer housing and the differential carrier, and an electromagnetic actuator unit operable for shifting the clutch unit between a first or "engaged" state to establish the Connected mode and a second or "released" state to establish the Disconnected mode.

The power-operated disconnect mechanism associated with each of the alternative embodiments of the disconnectable differential assembly is configured with a clutch unit having a first clutch member fixed for rotation with the differential carrier of the differential mechanism and a second clutch member coupled for rotation with the outer housing of the power transfer mechanism. The second clutch member is axially moveable between a first or "retracted" position whereat dog teeth on the second clutch member are disengaged from clutch teeth on the first clutch member to establish the clutch unit's "released" state and a second or "extended" position whereat its dog teeth are drivingly engaged with the clutch teeth on the first clutch member to establish a clutch unit's "engaged" state. A biasing arrangement is provided for normally biasing the second clutch member toward its retracted position. The electromagnetic actuator unit is non-rotatably mounted externally of the outer housing and includes an annular solenoid and a moveable actuation component, configured as a magnetic plunger. A clutch actuation mechanism interconnects the plunger to the second clutch member such that movement of the plunger between a first or "non-actuated" position and a second or "actuated" position results in corresponding movement of the second clutch member between its retracted and extended positions while facilitating rotation of the second clutch member relative to the plunger. Energization of the solenoid causes the plunger to move from its non-actuated position into its actuated position in opposition to the biasing exerted by the biasing arrangement. De-energization of the solenoid permits the biasing arrangement to forcibly return the plunger to its non-actuated position.

In accordance with a first non-limiting embodiment, the first clutch member is a face clutch with clutch teeth extending axially from the differential carrier, and the second clutch member is a dog plate clutch sleeve having a cylindrical sleeve portion with external splines and a dog plate portion with axially-extending dog teeth. The external splines on the cylindrical sleeve portion are in constant mesh with the internal splines formed in the outer housing to cause common rotation of the dog plate clutch sleeve with the power transfer mechanism while permitting axial movement of the dog plate clutch sleeve. The dog teeth on the dog plate portion are configured to be displaced from engagement with the clutch teeth when the dog plate clutch sleeve is located in its retracted position when the solenoid is de-energized and further configured to be driving coupled to the clutch teeth when the dog plate clutch sleeve is located in its extended position when the solenoid is energized. The clutch actuation mechanism is configured to include a first actuation plate latched to the plunger, a second actuation plate having actuation tabs passing through cut-outs in the outer housing and which are latched to the dog plate clutch sleeve, and a thrust bearing operably disposed between the first and second actuation plates.

In accordance with a second non-limiting embodiment, the first clutch member is a radial clutch with clutch teeth extending radially outwardly from the differential carrier, and the second clutch member is radial clutch sleeve having external splines and internal dog teeth. The external splines are in constant mesh with internal splines formed in the outer housing to facilitate common rotation of the radial clutch sleeve with the power transfer mechanism while permitting axial movement of the radial clutch sleeve. The radial dog teeth are configured to be displaced from engagement with the radial clutch teeth when the radial clutch sleeve is located in it retracted position and are further configured to be drivingly engaged with the clutch teeth when the radial clutch sleeve is located in its extended position. The clutch actuation mechanism is again configured to have a first actuation plate latched to the plunger, a second actuation plate having actuation tabs passing through the outer housing cut-outs and which are latched to the radial clutch sleeve, and a thrust bearing operably disposed between the first and second actuation plates.

In accordance with a third non-limiting embodiment, the first clutch member is a face clutch with clutch teeth extending axially from the differential carrier, and the second clutch member is a dog plate ring having a dog plate with axially-extending dog teeth, and a plurality of externally-splined drive lugs extending axially from the dog plate and which extend through the outer housing cut-outs. The external splines on the drive lugs are in constant mesh with the internal splines formed in the outer housing to facilitate common rotation with, an axial movement of, the dog plate ring relative to the outer housing. The dog teeth are configured to be displaced from engagement with the clutch teeth when the dog plate ring is located in it retracted position and are further configured to be drivingly engaged with the clutch teeth when the dog plate ring is located in its extended position. The clutch actuation mechanism is configured with a first actuation plate latched to the plunger, a second actuation plate latched to the drive lugs, and a thrust bearing disposed therebetween.

In accordance with a fourth non-limiting embodiment, the first clutch member is a face clutch with clutch teeth extending axially from the differential carrier, and the second clutch member is a stamped dog plate ring having external splines and axially-extending dog teeth. The external splines are in constant mesh with the internal splines formed in the outer housing so as to couple the stamped dog ring plate for common rotation with the outer housing while permitting axial sliding movement relative thereto. The dog teeth are configured to be disengaged from the clutch teeth when the stamped dog plate ring is locate in its retracted position and are further configured to drivingly engage the clutch teeth when the stamped dog plate ring is located in its extended position. The clutch actuation mechanism includes a first actuation plate latched to the plunger, a second actuation plate with a plurality of drive flanges extending through the outer housing cut-outs and which are fixed to the stamped dog plate ring, and a thrust bearing disposed therebetween.

In accordance with another alternative non-limiting embodiment, the plunger is mounted on a slidable support sleeve. The clutch actuation mechanism includes a first actuation plate latched to the support sleeve, a second actuation plate with pilot tabs extending into the outer housing cut-outs and which are latched to a plurality of drive lugs extending from the dog plate ring, and a thrust bearing disposed between the first and second actuation plates. The dog plate ring includes external splines that are in constant mesh with the internal splines formed in the outer housing. The dog plate ring also includes axially-extending dog teeth configured to selectively engage the clutch teeth on a face clutch defining the first clutch member in response to movement of the dog plate ring between its retracted and extended positions. The support sleeve moves in concert with movement of the plunger between its non-actuated and actuated position to cause the clutch actuation mechanism to move the dog plate ring between its corresponding retracted and extended positions.

In accordance with a further feature of the present disclosure, the solenoid unit is located in a fixed support structure, such as a transmission housing or an axle housing. A shim and a snap ring are used to ensure correct positioning of the solenoid unit relative to the actuation mechanism. The plunger may also be configured to include a taper on its outer diameter leading edge in relation to an overlapping portion of the core housing. The taper allows more consistent force over the entire range of axial plunger travel resulting in smoother engagement.

Further areas of applicability will become apparent from the detailed description and appended drawings to be disclosed herein. As such, the description and specific examples listed in this Summary section are intended for purposes of defining particular aspect and features of the present disclosure and are not intended to limit the scope of protection afforded to the inventive concepts.

DRAWINGS

The drawings described herein are intended to illustrate several features of alternative and non-limiting embodiments without limiting the scope of protection afford to the inventive concepts associated with the present disclosure. The drawings include:

FIG. 1 is a diagrammatic illustration of a vehicle architecture for an exemplary electric vehicle (EV) equipped with a primary electrically-powered drivetrain for driving a set of primary (i.e. front) ground-engaging wheels, a secondary electrically-powered drivetrain for selectively driving a set of secondary (i.e. rear) ground-engaging wheels, and a control system for controlling operation of both the primary and secondary drivetrains;

Corresponding reference numbers indicate corresponding components throughout the several views of the drawings.

DETAILED DESCRIPTION

Figure 1:
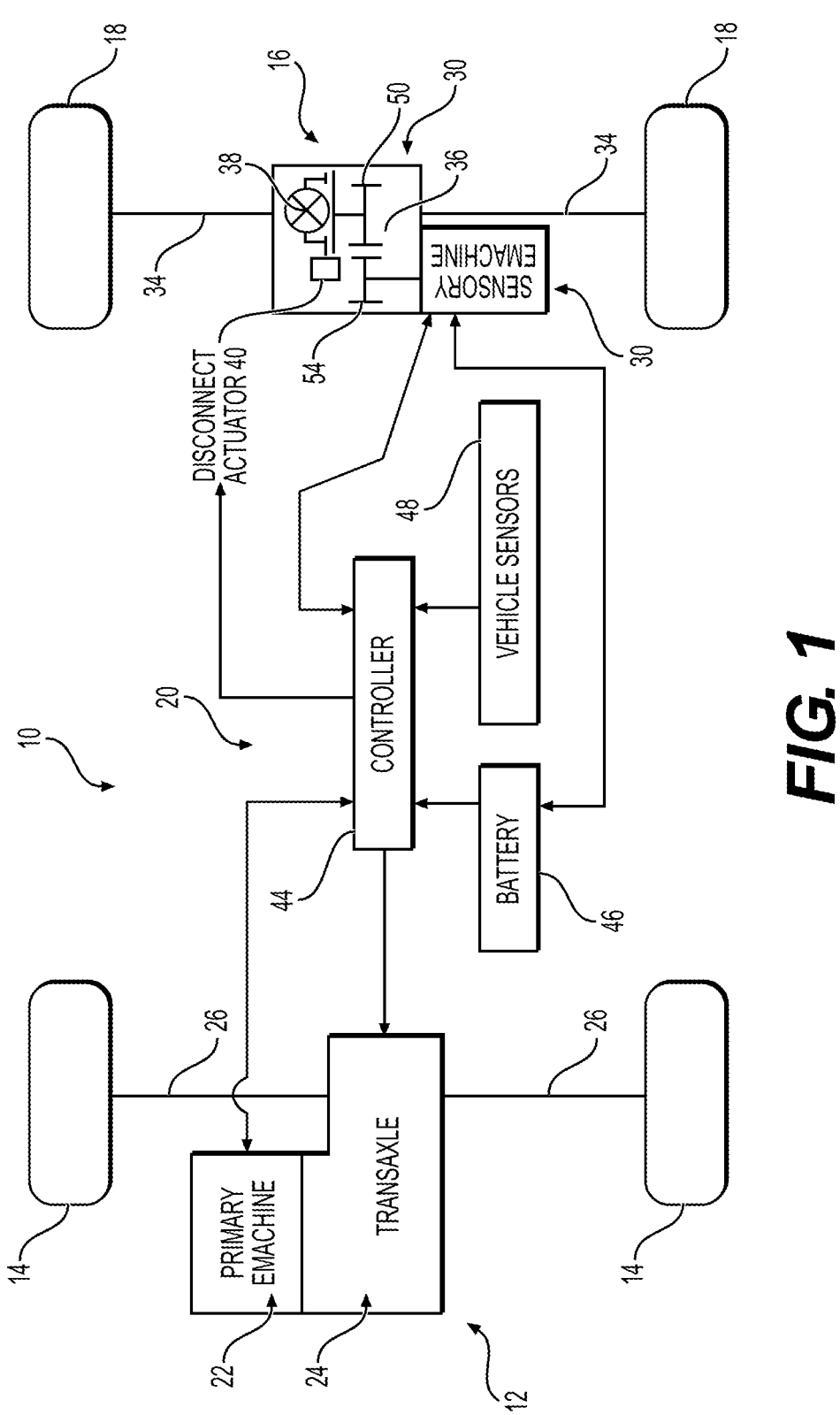

Example embodiments of various alternative configurations for disconnectable differential assemblies which incorporate the inventive concepts of the present disclosure will now be more fully described with reference to the accompanying drawings. It is anticipated that those skilled in the art will fully comprehend all aspects, features and potential improvements associate with inventive concepts embodied in each of the alternative configurations shown in the drawings and described in detail herein.

With initial attention directed to FIG. 1, an exemplary vehicle architecture for an electric vehicle 10 is generally shown to include a primary (i.e. front) electrically-powered drivetrain 12 configured to generate and transmit motive power (i.e., drive torque) to a pair of primary (i.e. front) ground-engaging wheels 14, a secondary (i.e. rear) electrically-powered drivetrain 16 configured to selectively generate and transmit drive torque to a pair of secondary (i.e. rear) ground-engaging wheels 18, and a control system 20 operable to control primary drivetrain 12 and secondary drivetrain 16. Primary drivetrain 12 is schematically shown to include a primary electric motor 22, a transaxle 24 driven by primary electric motor 22, and a pair of primary axleshaft 26 interconnecting primary wheels 14 to a primary differential assembly (not specifically shown) associated with transaxle 24. Drive torque generated by primary electric motor 22 can be multiplied via one or more gearsets within transaxle 24 and delivered to primary wheels 14 to define a two-wheel drive (2WD) mode of vehicle operation.

With continued attention to FIG. 1, secondary drivetrain 16 is schematically shown to include a secondary electric motor 30, a disconnectable differential assembly 32 selectively driven by secondary electric motor 30, and a pair of secondary axleshafts 34 interconnecting secondary wheels 18 to differential assembly 32. As will be described in greater detail, disconnectable differential assembly 32 is generally configured to include a power transfer mechanism 36 driven by secondary electric motor 30, a differential mechanism 38 interconnecting secondary axleshafts 34, and a power-operated disconnect mechanism 40 operable for selectively coupling and uncoupling an output of power transfer mechanism 36 to an input of differential mechanism 38. When disconnect mechanism 40 is operating in a first or "Connected" mode, secondary electric motor 30 transmits drive torque to secondary wheels 18 which, in conjunction with the drive torque transmitted via primary electric motor 22 to primary wheels 14, defines a four-wheel drive (4WD) mode of vehicle operation. Control system 20 is shown schematically to generally include a controller 44 configured to control operation of primary motor 22, secondary motor 30 and power-operated disconnect mechanism 40 in response to a plethora of vehicle inputs (indicated by vehicle sensors 48), and powered by an electric power source (indicated by battery 46).

Figure 2:
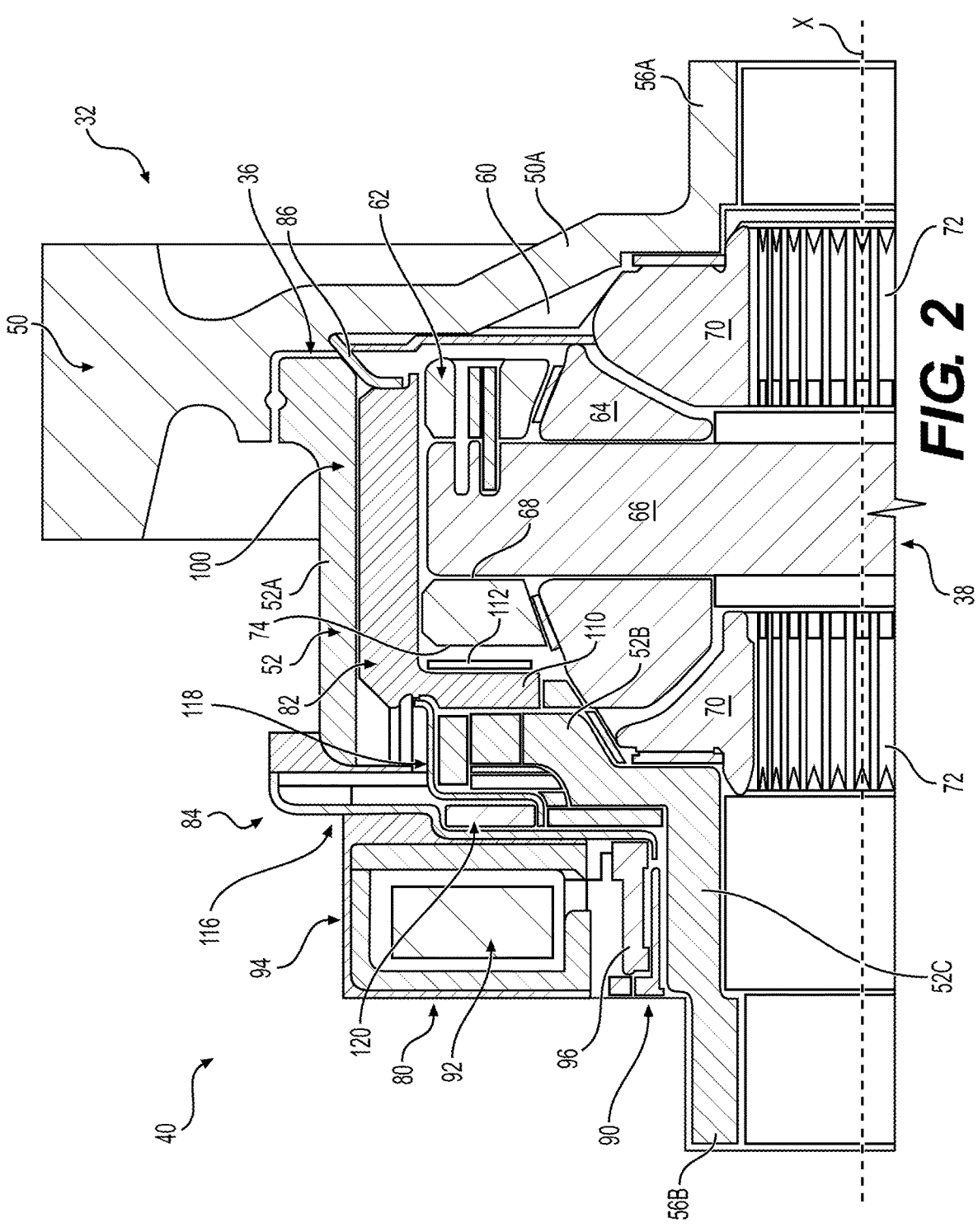
FIG. 2 is a partial sectional view of a disconnectable differential assembly associated with the secondary electrically-powered drivetrain shown in FIG. 1 and generally configured to include a power transfer mechanism, a differential mechanism, and a power-operated disconnect mechanism.
Figures 3A, 3B:
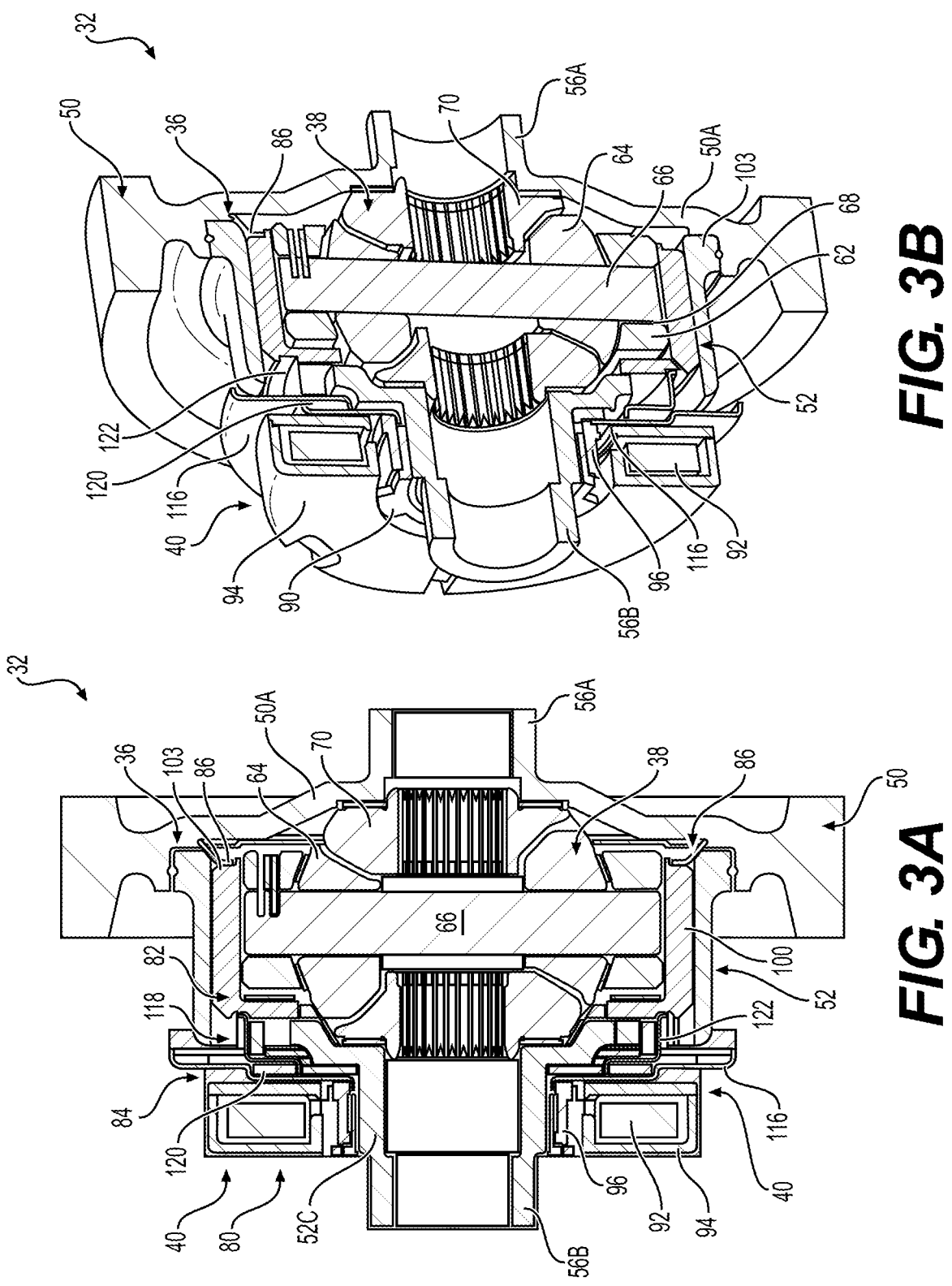
FIGS. 3A and 3B are full sectional views of the disconnectable differential assembly shown in FIG. 2 with the power-operated disconnect mechanism having an electromagnetic actuator unit operable to selectively shift a clutch unit between a first state and a second state.
Figure 30A:
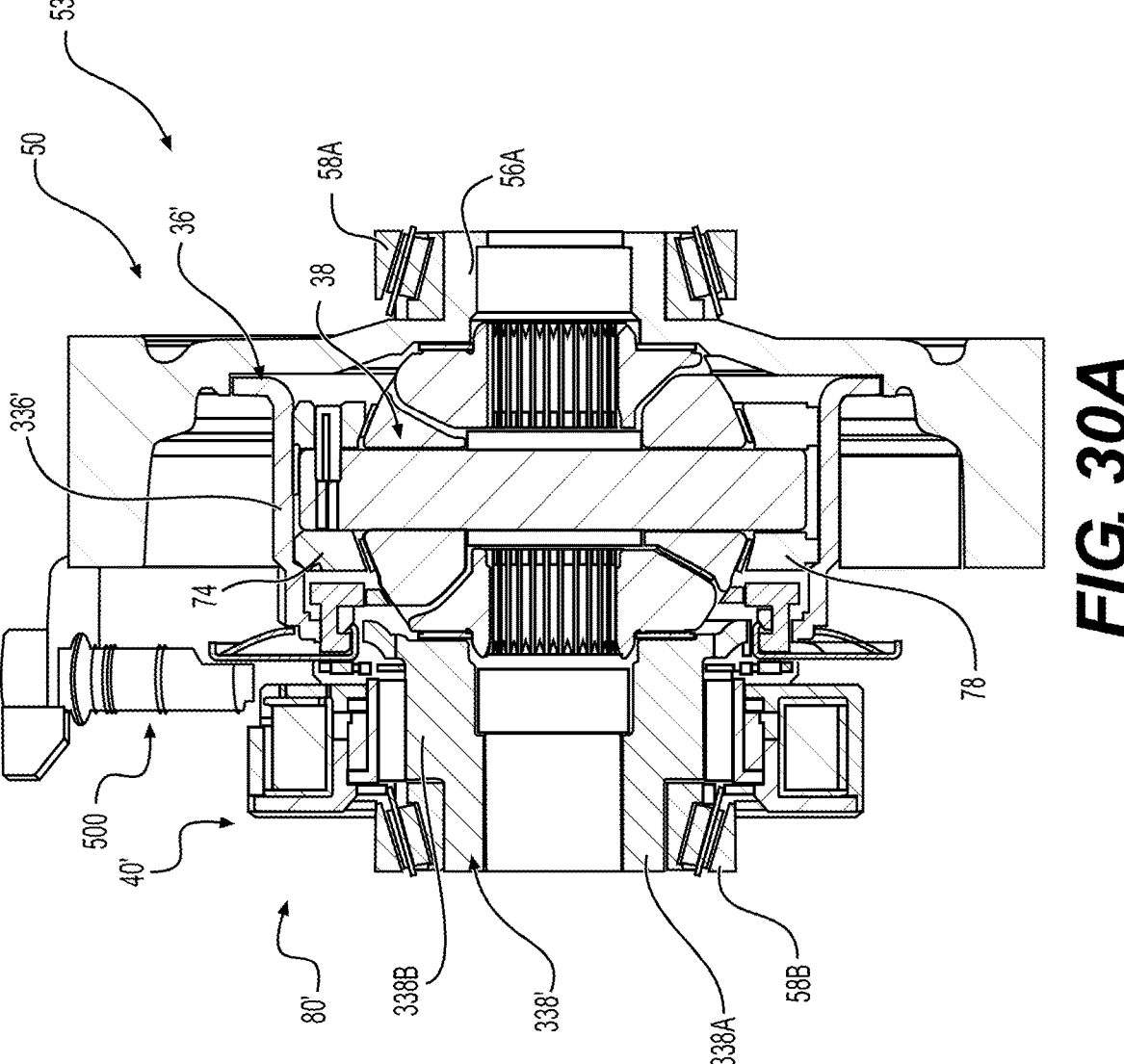
FIGS. 30A through 30C are full sectional views of another, non-limiting, embodiment of a disconnectable differential assembly constructed in accordance with the teachings of the present disclosure.
Figure 30C:
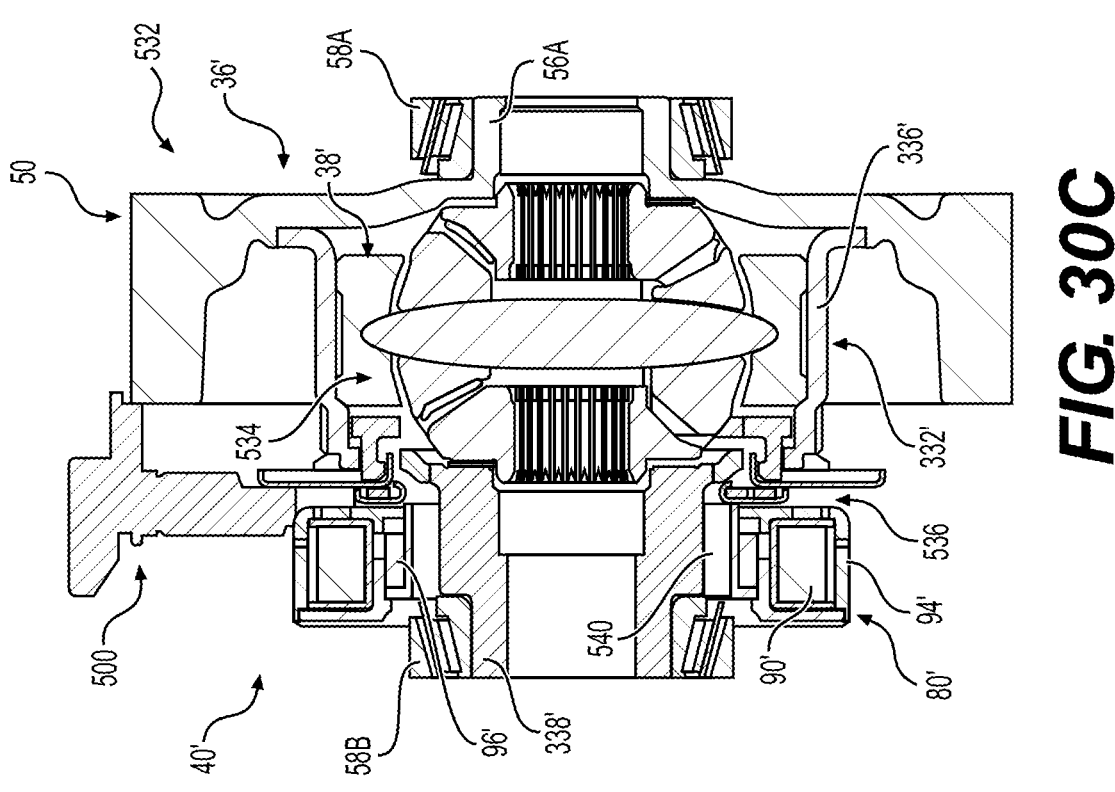
Figure 30B:
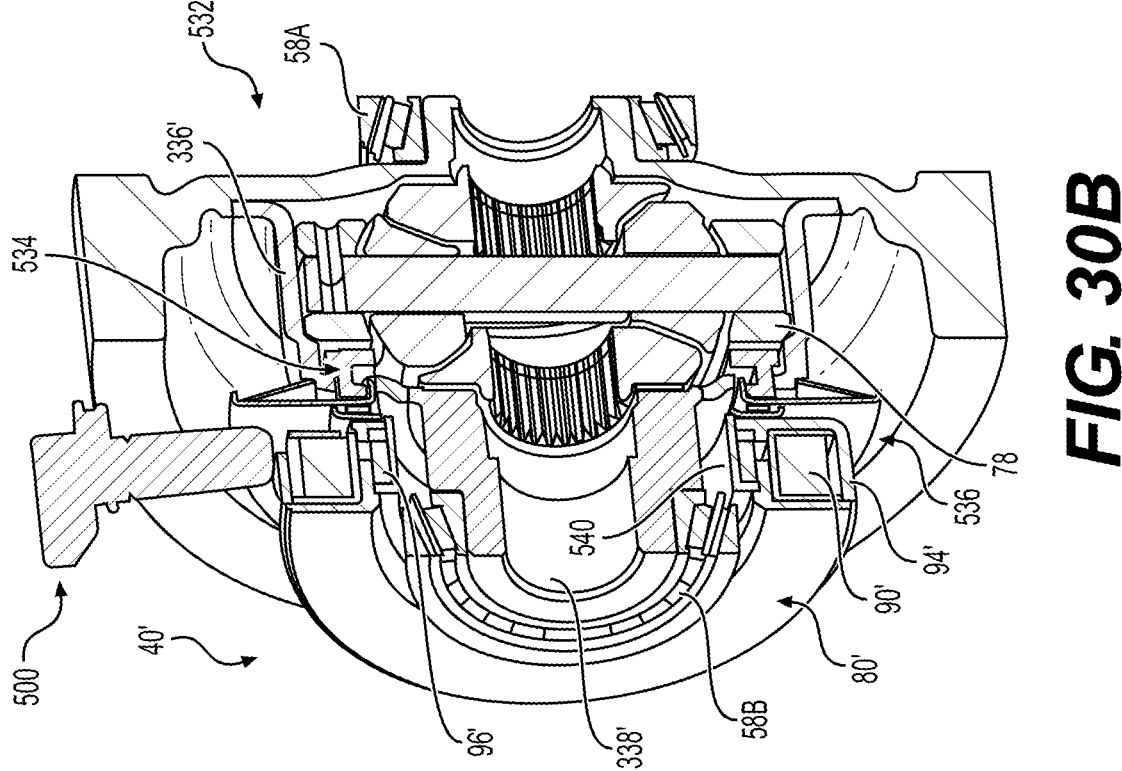

With particular reference now to FIGS. 2, 3A and 3B, a first non-limiting embodiment of a disconnect differential assembly 32 will be described. Power transfer mechanism 36 is generally shown to include a ring gear 50 and a bell-shaped outer housing 52 fixed to ring gear 50 for rotation about a common axis "X". Ring gear 50 is adapted to be driven by an output gear 54 (FIG. 1) of secondary electric motor 30. Ring gear 50 and outer housing 52 define a pair of laterally-spaced cylindrical bosses 56A, 56B upon which disconnect differential assembly 32 is rotatably supported in a housing (not shown) via a pair of laterally-spared bearing assemblies 58A, 58B (See FIG. 30a). An axial hub section 52A and a radial ring section 52B of outer housing 52 cooperate with a plate portion 50A of ring gear 50 to define an internal cavity 60 within which differential mechanism 38 is supported for rotation about the "X" axis.

Figures 4, 5:
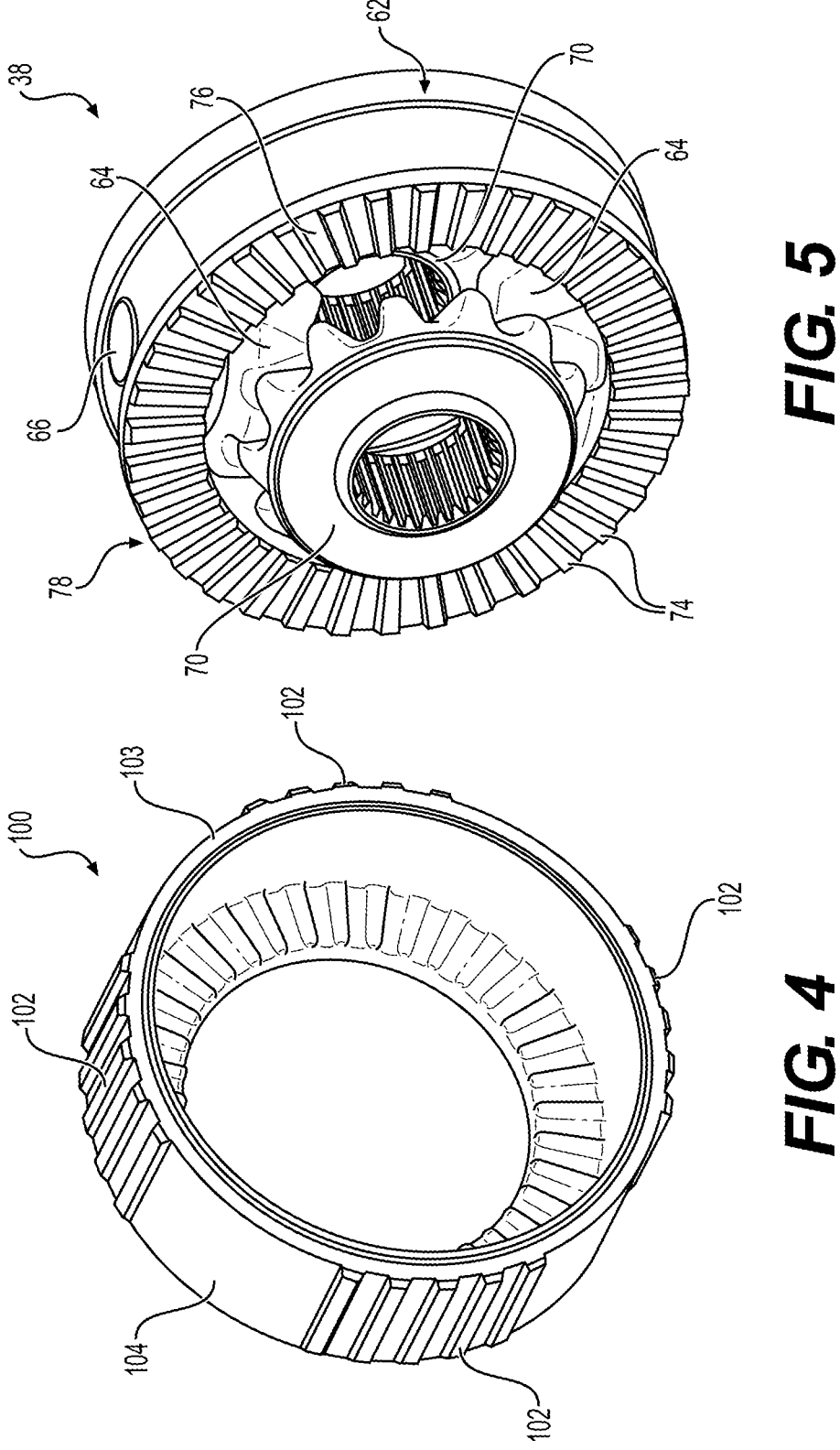
FIG. 4 is an isometric view of an axially-moveable dog plate clutch sleeve associated with the clutch unit shown in FIGS. 3A and 3B.
FIG. 5 is an isometric view of the differential mechanism shown in FIGS. 3A and 3B and including a differential carrier, a differential gearset supported by the differential carrier, and a face clutch plate extending from the differential carrier and which is associated with the clutch unit.

Differential mechanism 38 is shown to include a differential carrier 62, a pair of differential pinions 64 rotatably mounted on a pinion post 66 having its opposite ends secured in polar apertures 68 formed in differential carrier 62, and an pair of differential side gears 70 each meshed with both differential pinions 64. As is otherwise conventional, each differential side gear 70 has internal splines 72 configured to mesh with external splines formed on secondary axleshafts 34, whereby the output of differential mechanism 38 is drivingly connected to secondary wheels 18. Differential mechanism 38 is rotatably supported within internal cavity 60 of power transfer mechanism 36. As best shown in FIG. 5, a plurality axially-extending clutch teeth 74 are formed on an exterior end surface 76 of differential carrier 62 so as to define a first clutch member, configured as a face clutch 78.

Figures 6A, 6B:
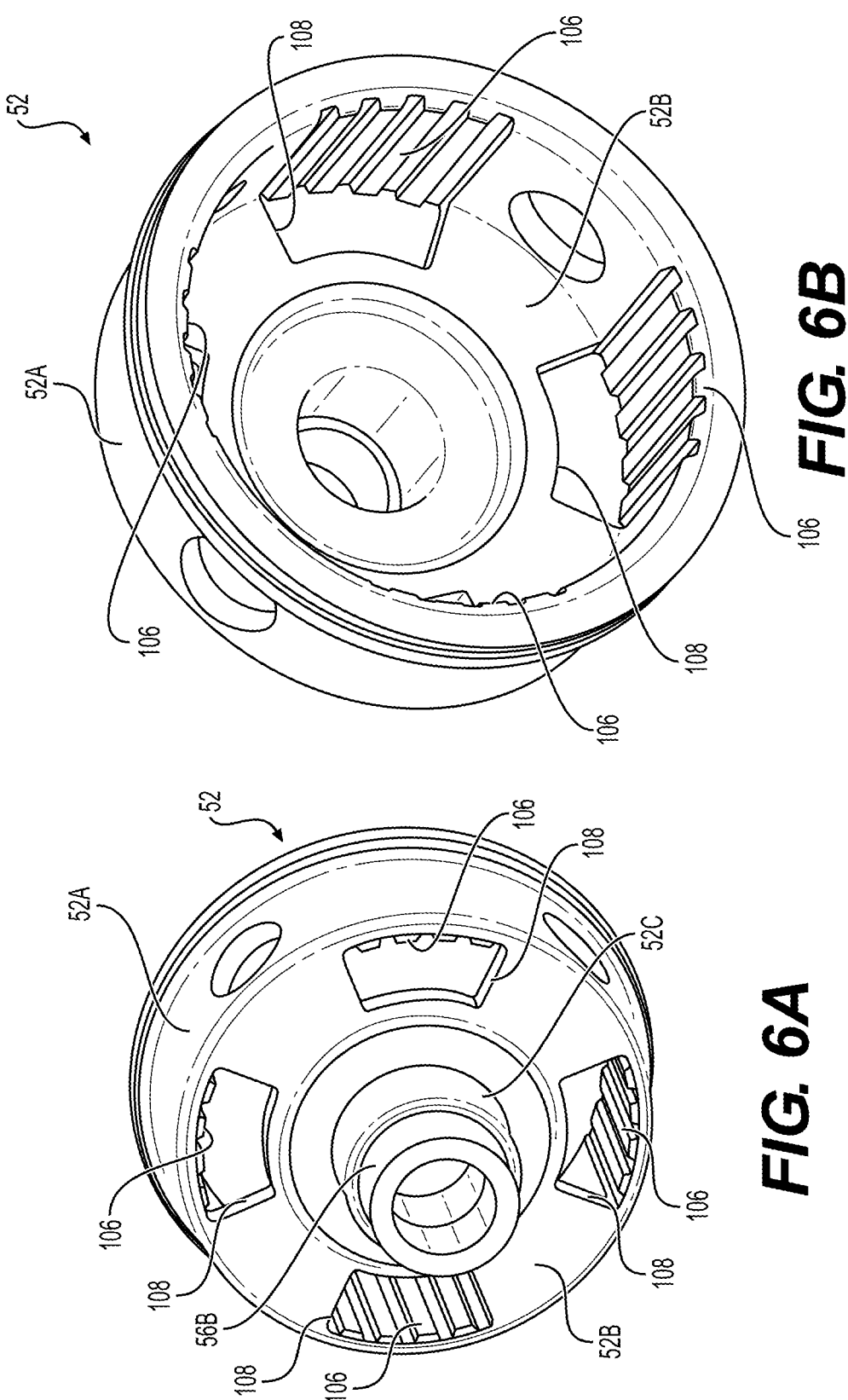
FIGS. 6A and 6B are isometric views of an outer housing associated with the power transfer mechanism shown in FIGS. 3A and 3B.

Power-operated disconnect mechanism 40 is shown to generally include an electromagnetic actuator unit 80, a clutch unit 82, a clutch actuation unit 84 and a biasing arrangement 86. Electromagnetic actuator unit 80 is annular in configuration and is oriented to surround an intermediate boss segment 52C of outer housing 52. Electromagnetic actuator unit 80 is non-rotatably supported on intermediate boss segment 52C via a tubular bushing 90 and includes a solenoid 92, a clam-shell pole or core housing 94 encasing and surrounding solenoid 92, and a plunger 96 supported on bushing 90 for axially-sliding movement. In addition to face clutch ring 78 on differential carrier 62, clutch unit 82 also includes a second clutch member, shown as a dog plate clutch sleeve 100, which is configured to rotate with outer housing 52 of power transfer mechanism 36 and move axially with respect to face clutch ring 78. FIG. 4 best illustrates a plurality of four (4) equally-spaced externally-splined quadrants 102 formed on an outer surface 104 of a sleeve portion of dog plate clutch sleeve 100. FIGS. 6A and 6B illustrate a plurality of four (4) equally-spaced internally-splined quadrants 106 formed in axial section 52A of outer housing 52. Externally-splined quadrants 102 on dog plate clutch sleeve 100 are in constant mesh with internally-splined quadrants 106 in outer housing 52, whereby dog plate clutch sleeve 100 is coupled for common rotation with outer housing 52 but is capable of axial movement relative thereto. FIGS. 6A and 6B also illustrates a plurality of four (4) windows or cut-outs 108 formed in ring section 52B of outer housing 52 and in alignment with internally-splined quadrants 106. Dog plate clutch sleeve 100 is also shown to include a dog ring portion 110 extending form the sleeve portion and which is formed to include axially-extending dog teeth 112.

Clutch actuation unit 84 is best shown in FIGS. 2 and 3 to generally include a first actuation plate, 116, a second actuation plate 118, and a thrust bearing 120. First actuation plate 116 engages plunger 96, second actuation plate 118 has a plurality of four (4) actuation tabs 122 extending through cut-outs 108 in outer housing 52 and which engage dog ring portion 110 of dog plate clutch sleeve 100, and thrust bearing 120 is disposed between first actuation plate 116 and second actuation plate 118. Since actuation tabs 122 pass through cut-outs 108, second actuation plate 118 rotates with power transfer mechanism 36. Likewise, since first actuation plate is non-rotatable, thrust bearing 120 accommodates relative rotation between first actuation plate 116 and second actuation plate 118. Biasing arrangement 86 is configure as one or more spring plates acting between an end surface 103 of dog plate clutch sleeve 100 and ring portion 50A of ring gear 50.

In accordance with a preferred operational configuration, disconnect differential assembly 32 is normally operable in a Disconnected mode when electromagnetic actuator unit 80 is operating in a "power-off" condition and can be shifted into a Connected mode in response to electromagnetic actuator unit 80 being placed in a "power-on" condition. More specifically, clutch unit 82 is operating in a "released" state when the Disconnected mode is established and is operating in an "engaged" state when the Connected mode is established. The released state of clutch unit 82 is established when biasing arrangement 86 located clutch sleeve 100 in a retracted position whereat its dog teeth 112 are displaced from engagement with clutch teeth 74 on face clutch plate 78. Such axial movement of dog plate clutch sleeve 100 to its retracted position causes plunger 96 to be forcibly moved axially to a non-actuated position relative to solenoid 92 due to the interconnection established therebetween via clutch actuation unit 84. With dog plate clutch sleeve 100 located in its retracted position, differential carrier 62 is not drivingly connect with outer housing 52, whereby differential mechanism 38 is uncoupled from power transfer mechanism 36. As such, no drive torque is transmitted from secondary electric motor 30 through disconnectable differential assembly 32 to second wheels 18.

When it is desired to transmit torque from secondary electric motor 30 to secondary wheels 18, disconnect differential assembly 32 is shifted into its Connected mode by shifting electromagnetic actuator unit 80 into its power-on condition for energizing solenoid 92. The magnetic circuit generated upon energization of solenoid 92 causes magnetic plunger 96 to move axially from its non-actuated position into an actuated position which, in turn, causes dog plate clutch sleeve 100 to move from its retracted position into an extended position whereat its dog teeth 112 are engaged with clutch teeth 74 on face clutch plate 78. Such movement of plunger 96 to its actuated position and dog plate clutch sleeve 100 to its extended position, due to energization of solenoid 92, is in opposition to the biasing exerted thereon by spring plates 86. With dog plate clutch sleeve 100 located and held in its extended position, differential carrier 62 is drivingly connected to outer housing 52, whereby differential mechanism 38 is coupled to power transfer mechanism 36. As such, drive torque generated by secondary electric motor 30 is transmitted from disconnectable differential assembly 32 to secondary wheels 18 to establish the 4WD mode. Additionally, regeneration of the power supply can be controlled via shifting disconnect differential assembly 32 into its Connected mode when secondary electric motor 30 is not transmitting torque via a regeneration control associated with control system 20.

Figures 8, 9:
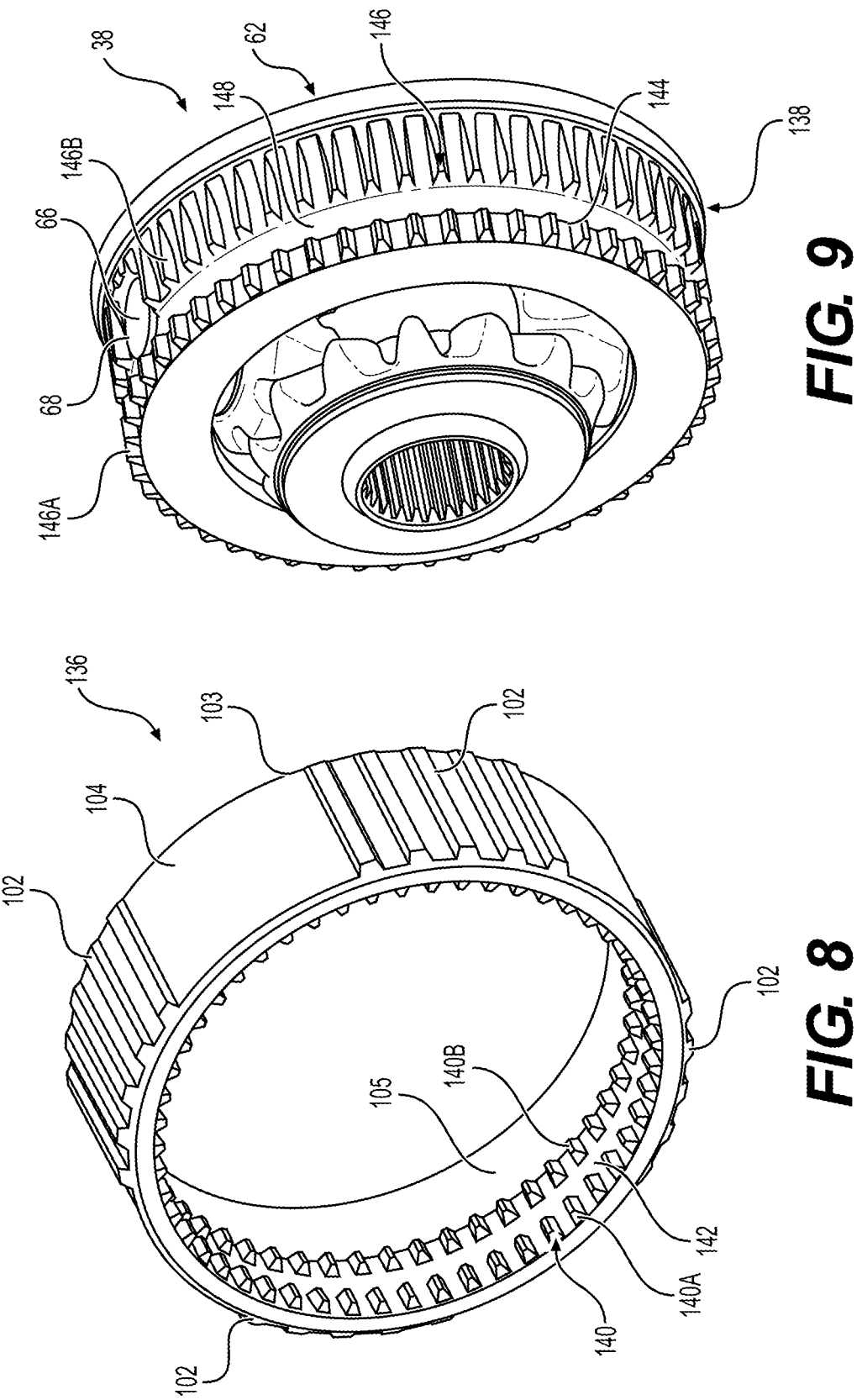
FIG. 8 is an isometric view of an axially-moveable radial clutch sleeve associated with the clutch unit shown in FIGS. 7A and 7B.
FIG. 9 is an isometric view of the differential mechanism shown in FIGS. 7A and 7B and including a differential carrier, a differential gearset supported by the differential carrier, and a radial clutch hub extending from the differential carrier and which is associated with the clutch unit.
Figures 10A, 10B:
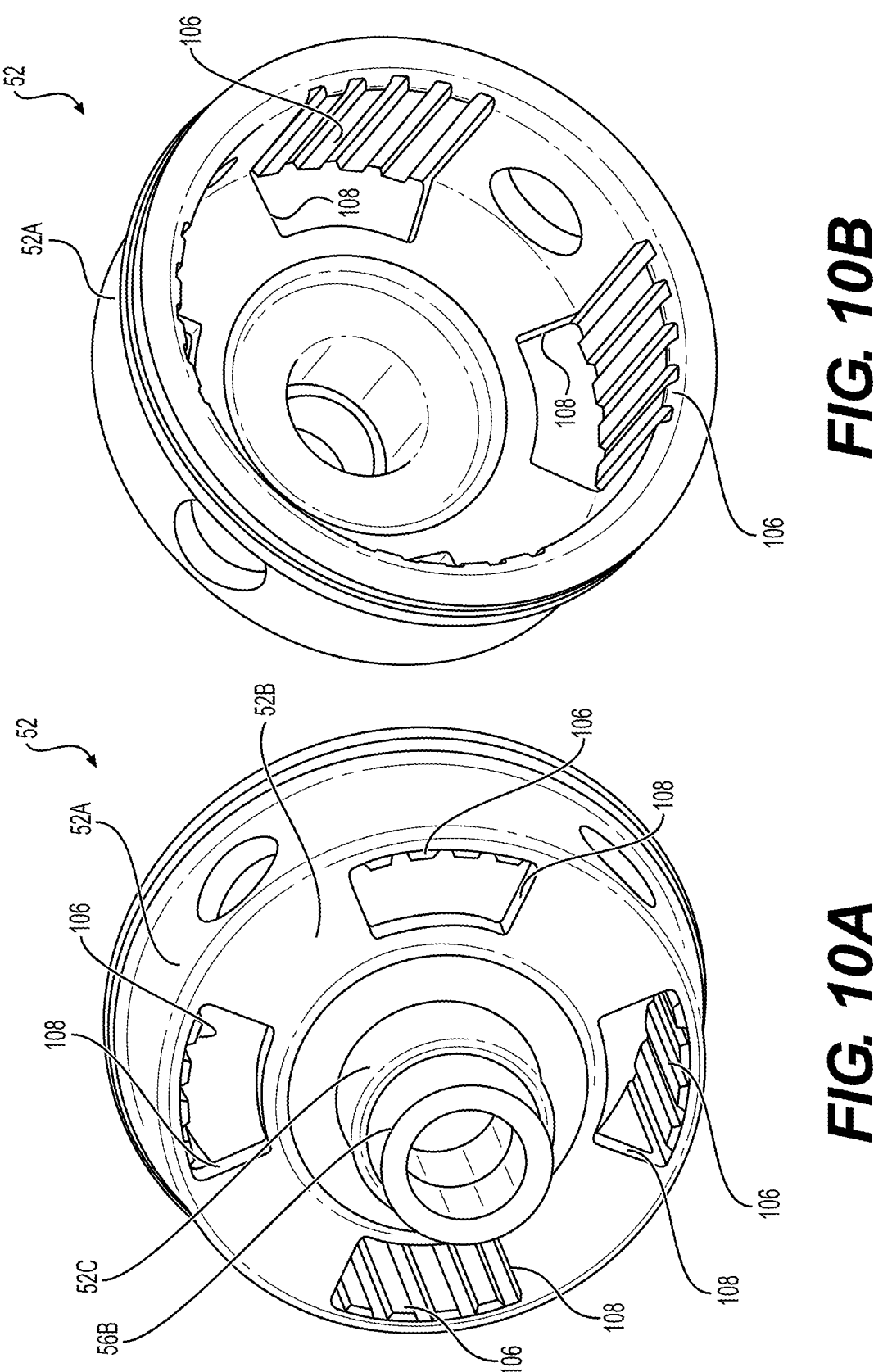
FIGS. 10A and 10B are isometric views of an outer housing associated with the power transfer mechanism shown in FIGS. 7A and 7B.
Figures 11A, 11B:
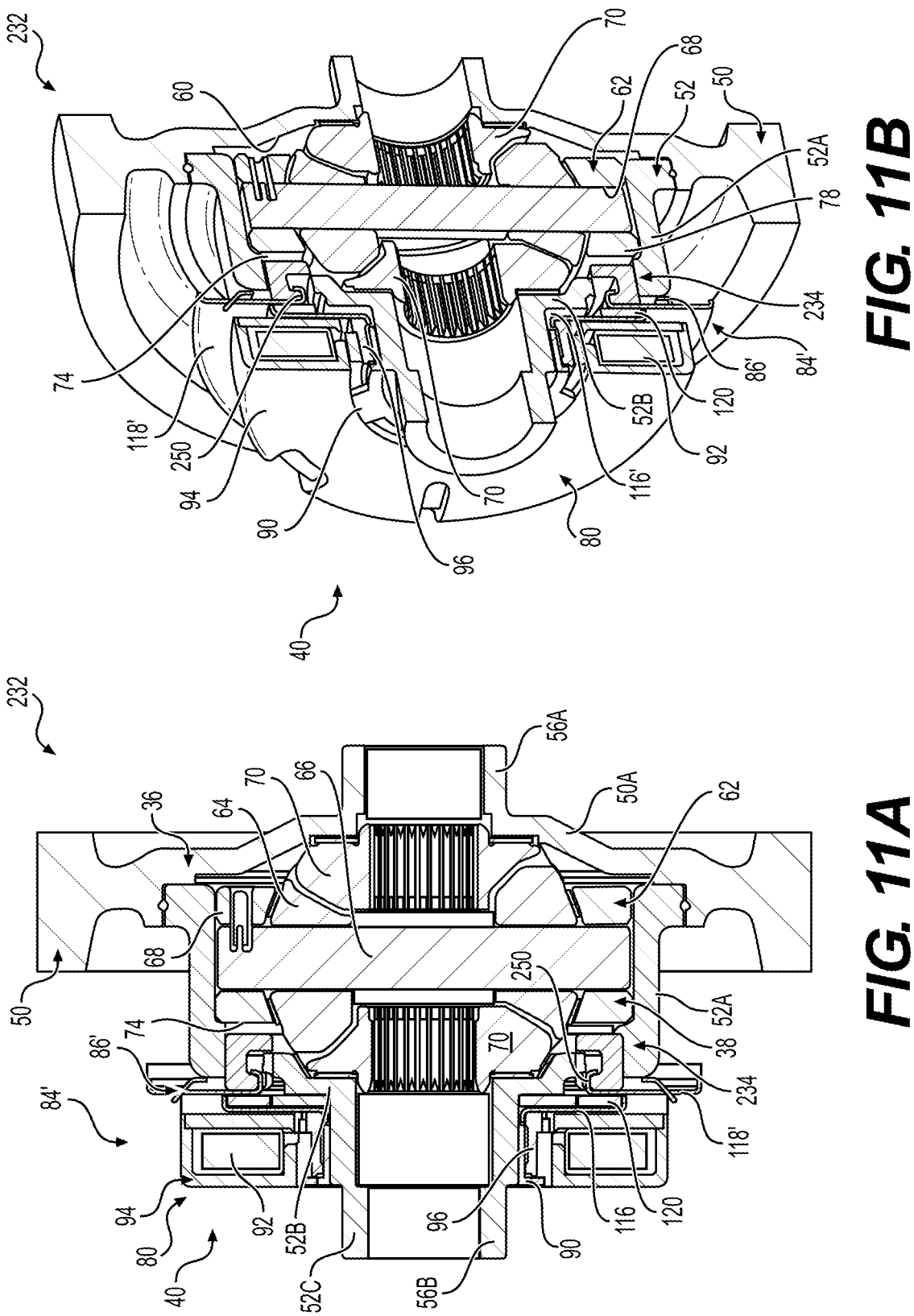
FIGS. 11A and 11B are full sectional views illustrating another alternative non-limiting embodiment of a disconnectable differential assembly configured for installation within the secondary electrically-powered powertrain of FIG. 1.
Figures 12A, 12B, 13:
FIGS. 12A and 12B are isometric views of an axially-moveable dog plate ring associated with the clutch unit shown in FIGS. 11A and 11B.
FIG. 13 is an isometric view, similar to FIG. 5, illustrating the differential mechanism and the face clutch plate associated with the disconnectable differential assembly shown in FIGS. 11A and 11B.
Figure 14B:
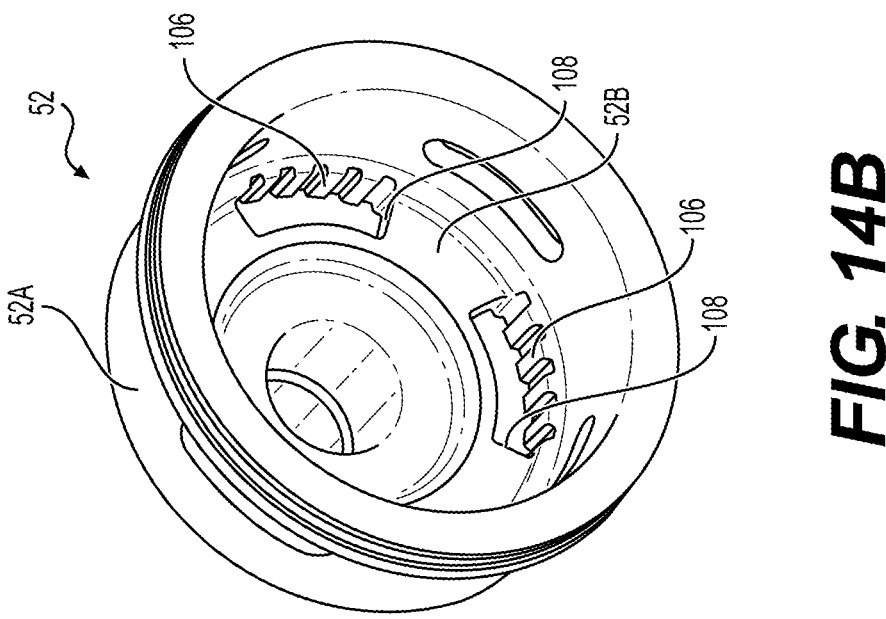
FIGS. 14A and 14B are isometric views of an outer housing associated with the power transfer mechanism shown in FIGS. 11A and 11B.
Figure 14A:
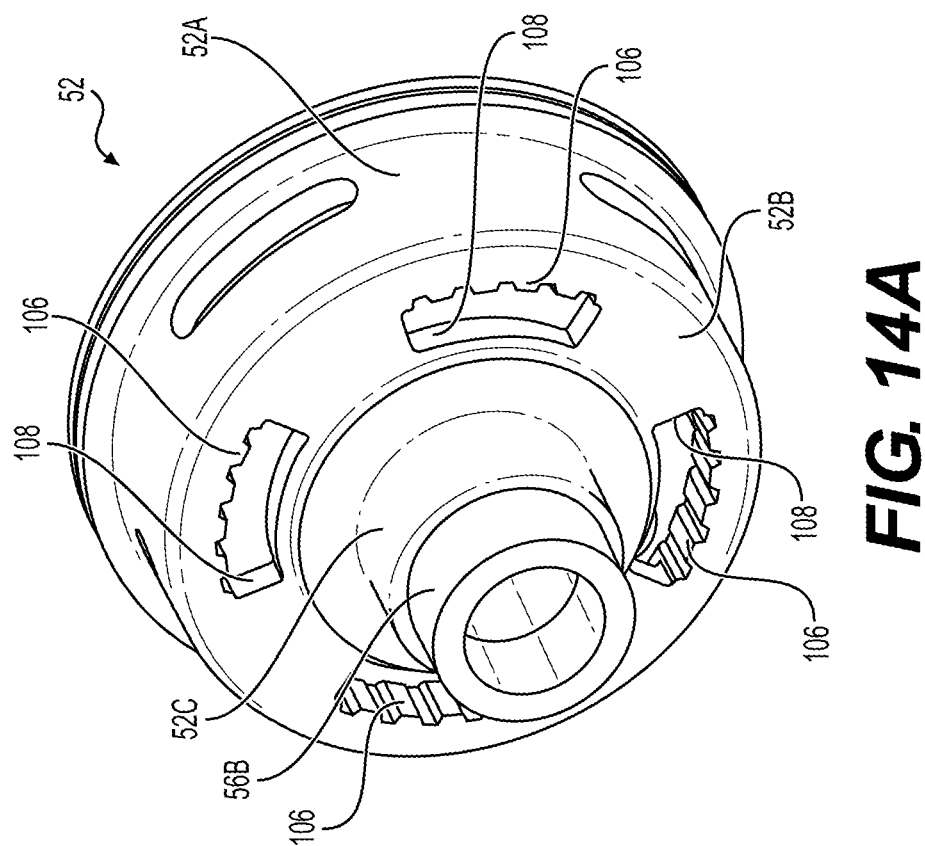
Figure 15:
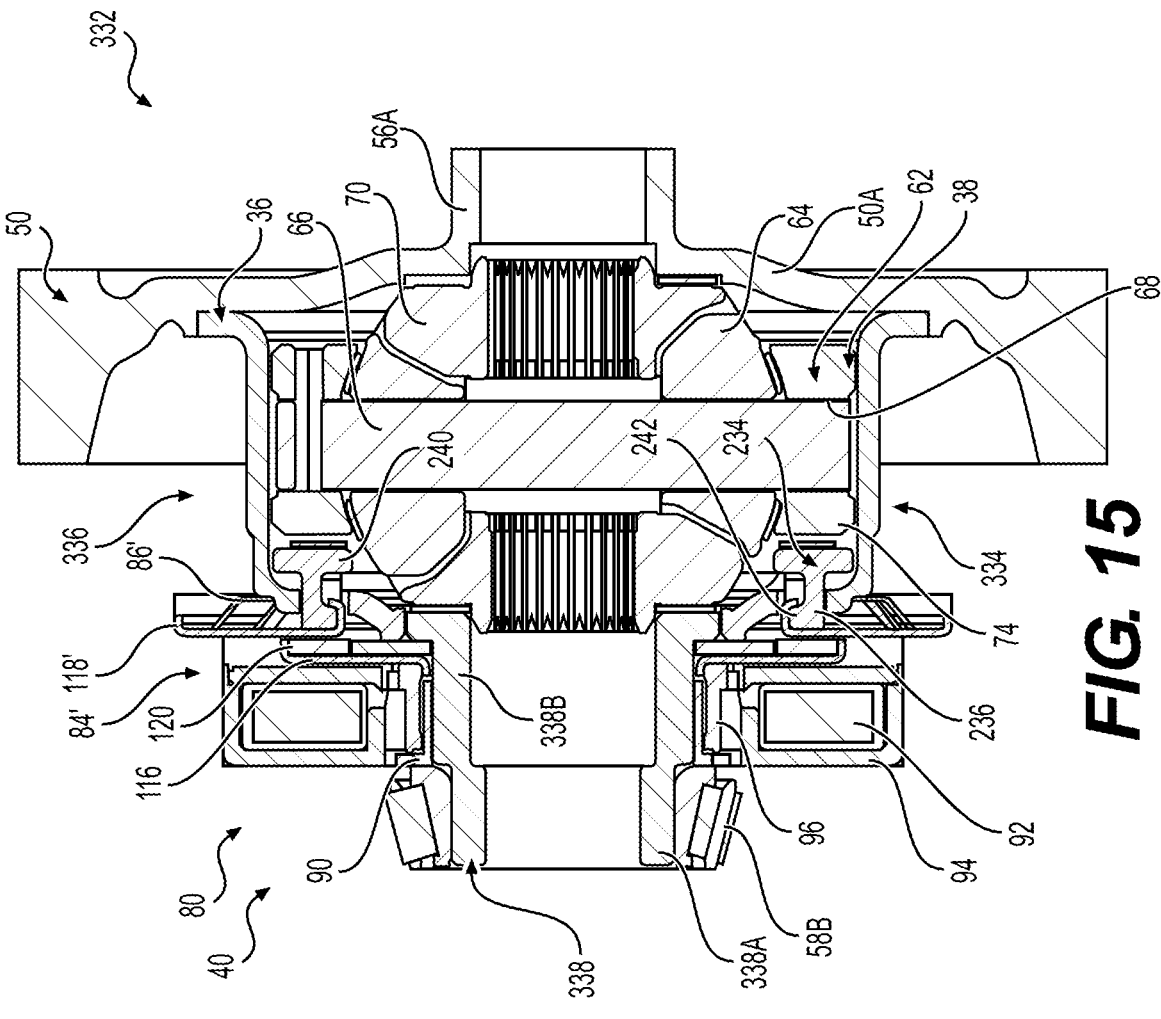
FIG. 15 is a full section view of yet another alternative, non-limiting, embodiment of a disconnectable differential assembly constructed in accordance with the teachings of the present disclosure.
Figures 16A, 16B, 17:
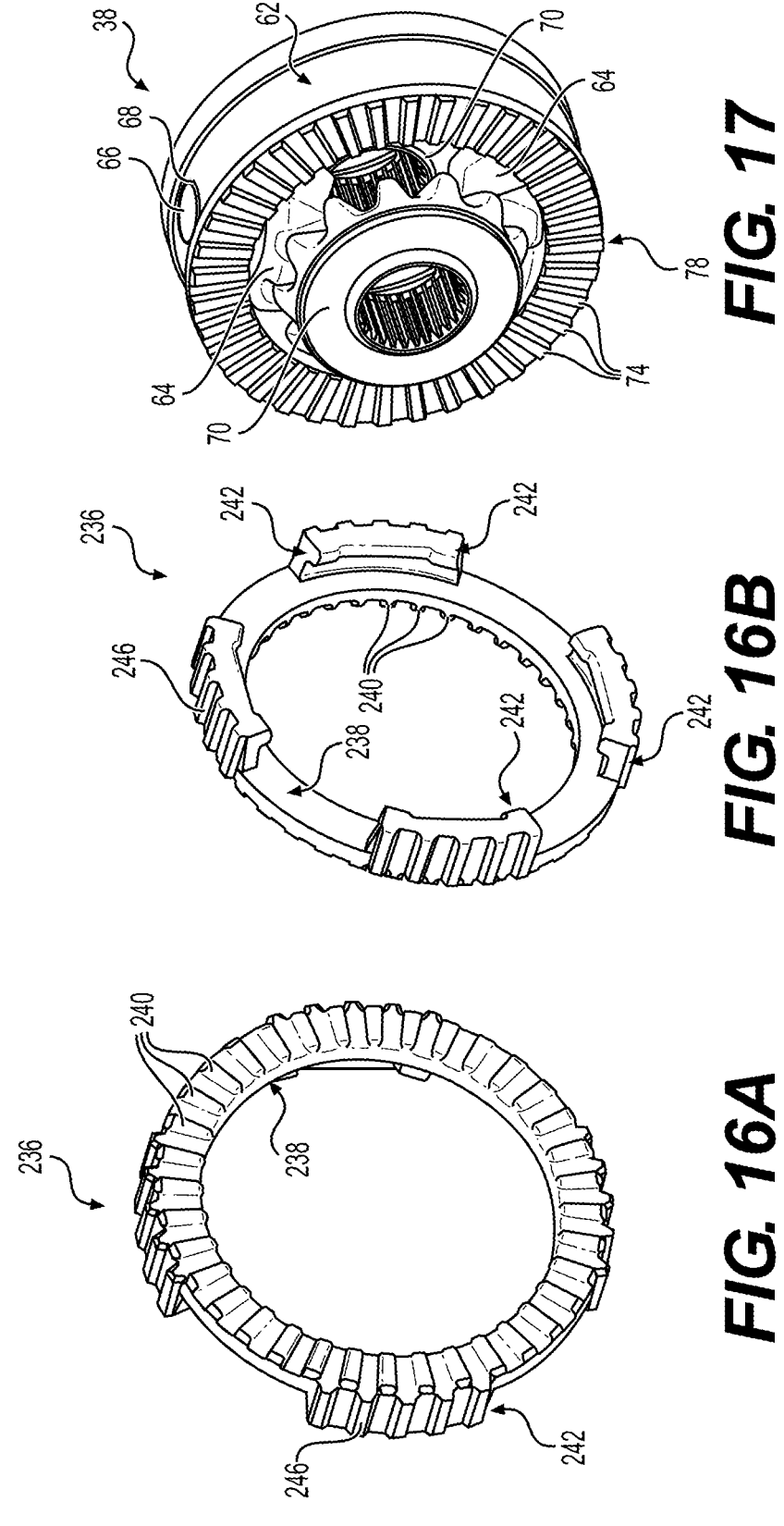
FIGS. 16A and 16B are isometric views of an axially-moveable dog plate ring associated with the clutch unit shown in FIG. 15.
FIG. 17 is an isometric view, similar to FIGS. 5 and 13, illustrating the differential mechanism and the face clutch plate associate with the disconnectable differential assembly of FIG. 15.

With attention now directed to FIGS. 7A through 10B of the drawings, a second non-limiting embodiment of a disconnect differential assembly 132 will now be described. Since many of the components shown in association with disconnect differential assembly 132 are generally similar, in terms of both structure and function, to those previously described for disconnect differential assembly 32, common reference numerals are used and further explanation thereof is not required. In particular, disconnect differential assembly 132 is configured to include a modified clutch unit 134 comprised of a radial clutch sleeve 136 (FIG. 8) and a clutch hub 138 (FIG. 9). Clutch sleeve 136 again includes a plurality of four (4) externally-splined quadrants 102 formed on outer surface 104 which are in continuous meshed engagement with internally-splined quadrants 106 formed in hub section 52A of outer housing 52. As such, clutch sleeve 136 is again coupled for common rotation with outer housing 52 and is capable of axial movement between retracted and extended position relative to clutch hub 138. However, clutch sleeve 136 now includes radial dog teeth 140 which extend radially inwardly from an inner surface 105. Dog teeth 140 are aligned to define dual rows comprised of first dogs 140A and second dogs 140B which are separated by non-toothed gaps 142.

Figures 7A, 7B:
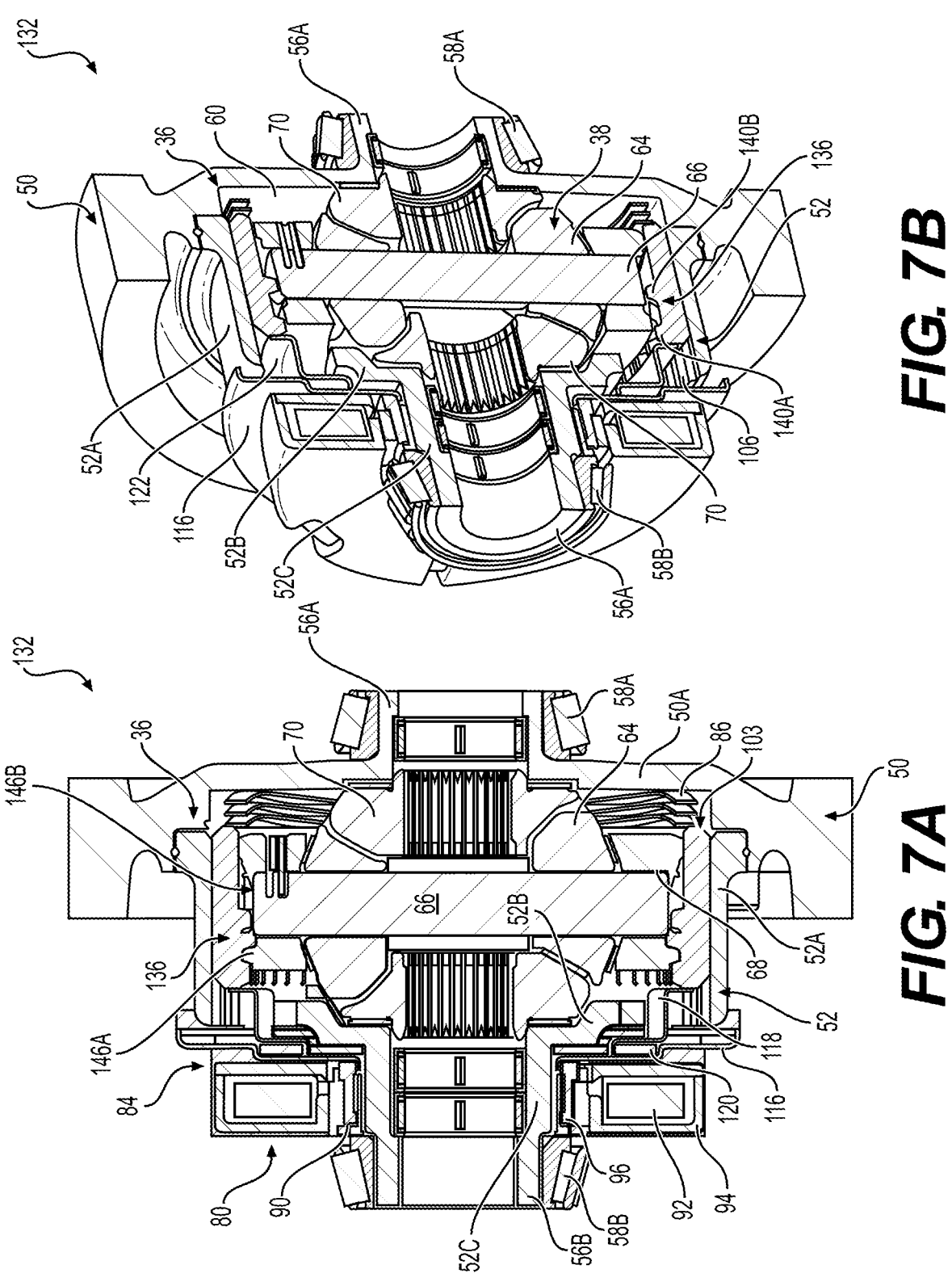
FIGS. 7A and 7B are full sectional views illustrating an alternative, non-limiting, embodiment of a disconnectable differential assembly configured for installation within the secondary electrically-powered drivetrain shown in FIG. 1 and having an electromagnetic actuator unit operable to selectively shift a clutch unit between first and second states.

FIG. 9 illustrates clutch hub 138 formed on an outer peripheral surface 144 of differential carrier 62 and includes radial clutch teeth 146 extending radially outwardly from outer surface 144. Clutch teeth 146 are axially aligned to define dual rows comprised of first clutch teeth 146A and second clutch teeth 146B separated by a non-toothed gap 148. FIGS. 7A and 7B illustrate clutch sleeve 136 located in its retracted position with clutch actuation unit 84 concomitantly locating plunger 96 in its non-actuated position due to the biasing applied thereto via spring plate 86 when electromagnetic actuator unit 80 is operating in its power-off condition. Thus, clutch unit 134 is in its released state for establishing the Disconnected mode for disconnect differential assembly 132. As shown, positioning of clutch sleeve 136 in its retracted position functions to cause first dogs 140A to be disengaged from first clutch teeth 146A and second dogs 140B to also be disengaged from second clutch teeth 146B. Thus, differential carrier 62 is uncoupled from outer housing 52.

Disconnect differential assembly 132 is configured to normally function in its Disconnected mode but can be shifted into its Connected mode in response to electromagnetic actuator unit 80 being placed in its power-on condition. Upon energization of solenoid 92, magnetic plunger 96 is move axially from its non-actuated position into its actuated position which, in turn, causes clutch sleeve 136 to slide axially from its retracted position to its extended position in opposition to the biasing exerted thereon by spring plate 86. Such shifting of clutch unit 134 into its engaged state functions to cause first dogs 140A to move into engagement with first clutch teeth 146A along with second dogs 140B moving into engagement with second clutch teeth 146B. Accordingly, differential carrier 62 is now coupled for rotation with outer housing 52, thereby connecting differential mechanism 38 to power transfer mechanism 36.

With particular attention now directed to FIGS. 11A through 14B of the drawings, a third non-limiting embodiment of a disconnect differential assembly 232 will now be detailed. Again, common reference numerals are used in these drawings to identify components of disconnect differential assembly 232 that are similar in terms of structure and/or function to these previously described in association with disconnect differential assembly 32 and 132. Differential mechanism 38 is generally similar to that shown in FIG. 5 and includes face clutch ring 78 with axially-extending clutch teeth 74 Disconnect differential assembly 232 is configured to include a modified clutch unit 234 and a slightly modified clutch actuation unit 84'. Regarding clutch unit 234, it now includes a dog clutch ring 236 (FIGS. 12A and 12B) located axially between differential mechanism 38 and electromagnetic actuator unit 40. This is in contrast to the coaxial relationship with clutch sleeve 100, 136 disposed between outer housing 50 and differential carrier 62 in the previously disclosed embodiments. Dog clutch ring 236 is configured to include a dog ring section 238 formed to include axially-extending dog teeth 240, and a plurality of four (4) drive lugs 242 extending axially from dog ring section 238 and having external spline teeth 246. As shown, drive lugs 242 extend through cut-outs 108 in outer housing 52 (FIGS. 14A and 14B) and their spline teeth 246 are meshed with internal splines 106 formed in outer housing 52. As such, dog clutch ring 236 is coupled for common rotation with power transfer mechanism 36 and is capable of axial sliding movement between its retracted and extended positions relative to face clutch 78 on differential carrier 62.

Clutch actuation unit 84' is now configured such that second actuation plate 118' has a plurality of four (4) locking flanges 250 oriented to engage and latch with drive lugs 242 on dog clutch ring 236. Accordingly, movement of plunger 96 between its non-actuated and actuated positions results in corresponding movement of dog clutch ring 236 between its retracted and extended positions. Biasing arrangement 86' has been relocated to place wave springs (or equivalent biasing device) between second actuation plate 118' and ring portion 52B of outer housing 52. As shown, biasing arrangement 86' is configured to normally bias dog clutch ring 236 toward its retracted position which, via clutch actuation unit 86', also functions to bias plunger 96 toward its non-actuated position when electromagnetic actuator unit 40 is in its power-off condition. As shown, location of dog clutch ring 236 in its retracted position functions to disengage dog teeth 240 on dog ring section 238 from clutch teeth 74 on face clutch 78, thereby placing clutch unit 234 in its released state so as to shift disconnect differential assembly 232 into its Disconnected mode.

Disconnect differential assembly 232 can be shifted into its Connected mode in response to energization of solenoid 92 which causes magnetic plunger 96 to slide from its non-actuated position into its actuated position and which, in turn, causes dog clutch ring 236 to slide axially from its retracted position into its extended position, in opposition to the biasing exerted thereon by biasing arrangement 86'. This shifting of clutch unit 234 into its engaged state functions to cause dog teeth 240 on dog clutch ring 236 to move into engagement with clutch teeth 74 on differential carrier 62. Accordingly, differential carrier 62 is coupled for rotation with outer housing 52, thereby connecting differential mechanism 38 to power transfer mechanism 36.

Figure 18B:
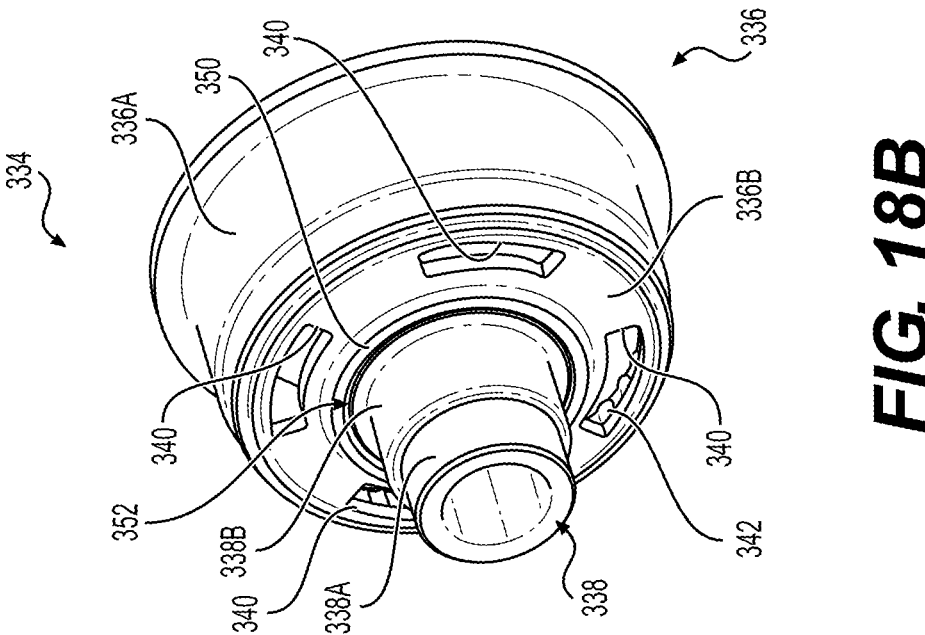
FIGS. 18A and 18B are isometric views of an outer housing unit associated with the power transfer mechanism shown in FIG. 15.
Figure 18A:
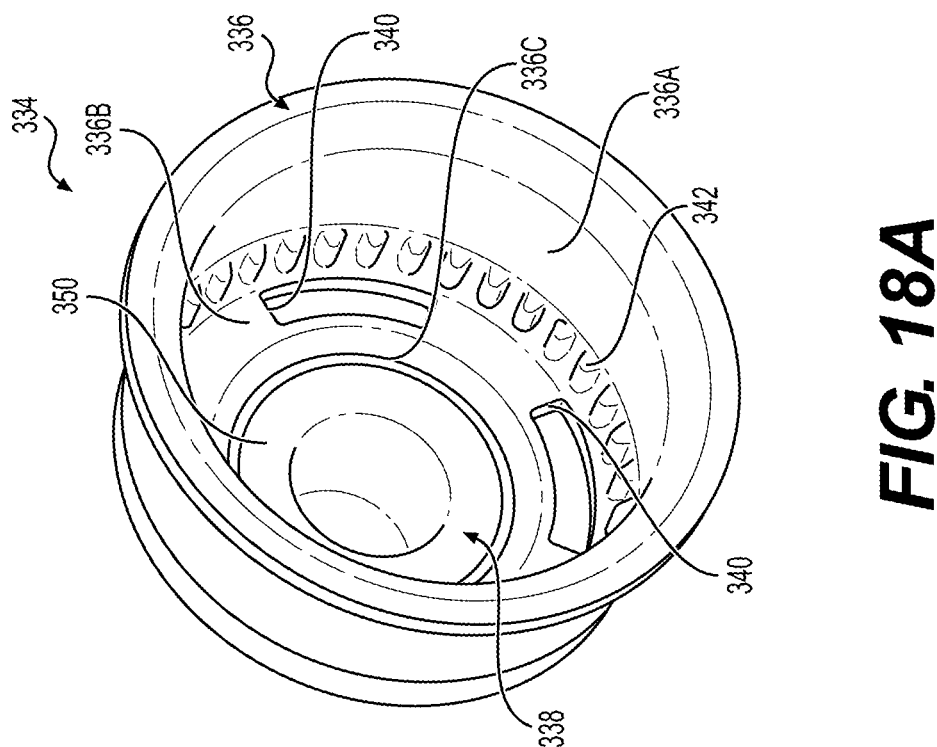

With attention directed to FIGS. 15 through 18B, a fourth non-limiting embodiment of a disconnect differential assembly 332 will now be detailed. In general, disconnect differential assembly 332 is similar to disconnect differential assembly 232 (FIGS. 11-14) with the exception that an outer housing unit 334 is now a two-piece combination of a stamped housing 336 and a hub 338 in substitution for the one-piece cast iron outer housing 52 with integral hub 52C, 56B and broached splines 106. This two-piece outer housing configuration provides weight savings. Stamped housing 336 is configured to include a cylindrical hub section 336A and a ring section 336B having a plurality of four (4) cut-outs 340. Hub section 336A is formed to include internal splines 342 (FIG. 18A). Lugs 242 on dog clutch ring 236 extend through cut-outs 340 and lug splines 246 are meshed with housing splines 242 to again facilitate rotation and axial movement of dog clutch ring 336. FIG. 18B best illustrates hub 338 to include a radial flange 350 located in and engaging a central aperture 336C of housing ring section 336B. While not limited thereto, a welded seam 352 (i.e. laser weld) is generated between hub flange 350 and housing ring section 336B to rigidly secure housing 336 to hub 338 and establish housing unit 334. As seen, hub 338 is configured to provide a first boss 338A for mounting of bearing 58B thereon and a second boss 338B on which bushing 90 is mounted. Other than the structural modifications described above, the function and operation of disconnect differential assembly 332 is identical to the description provided for disconnect differential assembly 232.

Referring now to FIGS. 19 through 29 of the drawings, a fifth non-limiting embodiment of a disconnect differential assembly 432 will now be described.

Again, common reference numbers are used to identify components that are similar to previously described components. In general, disconnect differential assembly 432 is configured with a modified clutch unit 434 and a modified clutch actuation unit 436 which are used in conjunction with the two-piece housing unit 334 of disconnect differential assembly 332 (See FIG. 15). More specifically, clutch unit 434 is shown to include a "stamped" dog plate ring 440 configured to include drive lugs 442 extending axially and radially from a disc-plate 444. Drive lugs 442 each define a radially-extending spline portion 442A and an axially-extending dog portion 442B stamped to extend between adjacent connecting sections 444A of disc-plate 444. Spline portion 442A of each lug 442 is configured to mesh with internal splines 342 in hub section 336A of outer housing 336. As such, dog plate ring 440 is configured to be rotatively driven by power transfer mechanism 36 while being capable of axial sliding movement between retracted and extended positions relative to clutch teeth 74' formed on face clutch plate 78' of differential carrier 62.

Figure 19:
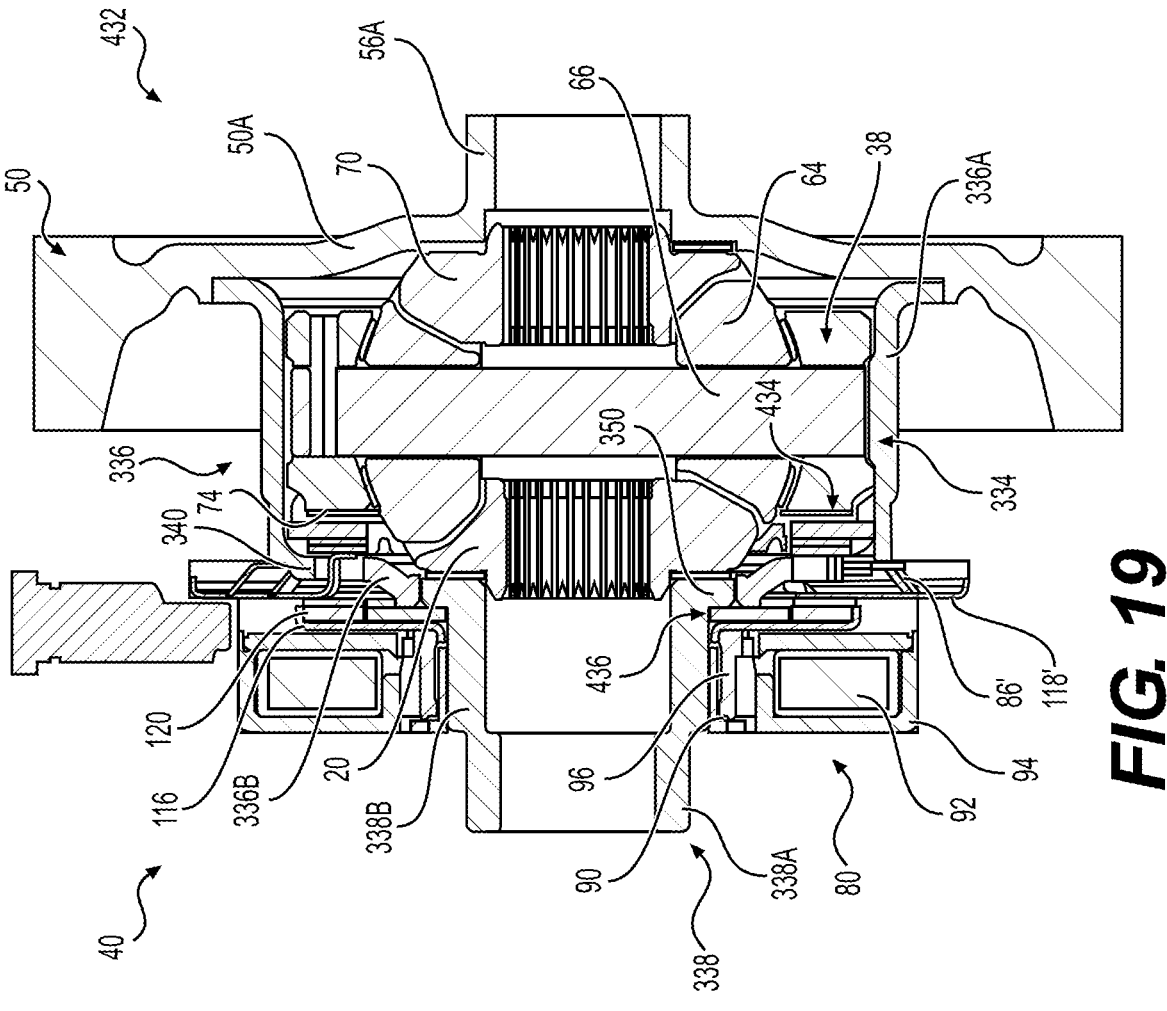
FIG. 19 is a full sectional view of a still further alternative, non-limiting, embodiment of a disconnectable differential assembly constructed in accordance with the teachings of the present disclosure.
Figures 20, 21, 22:
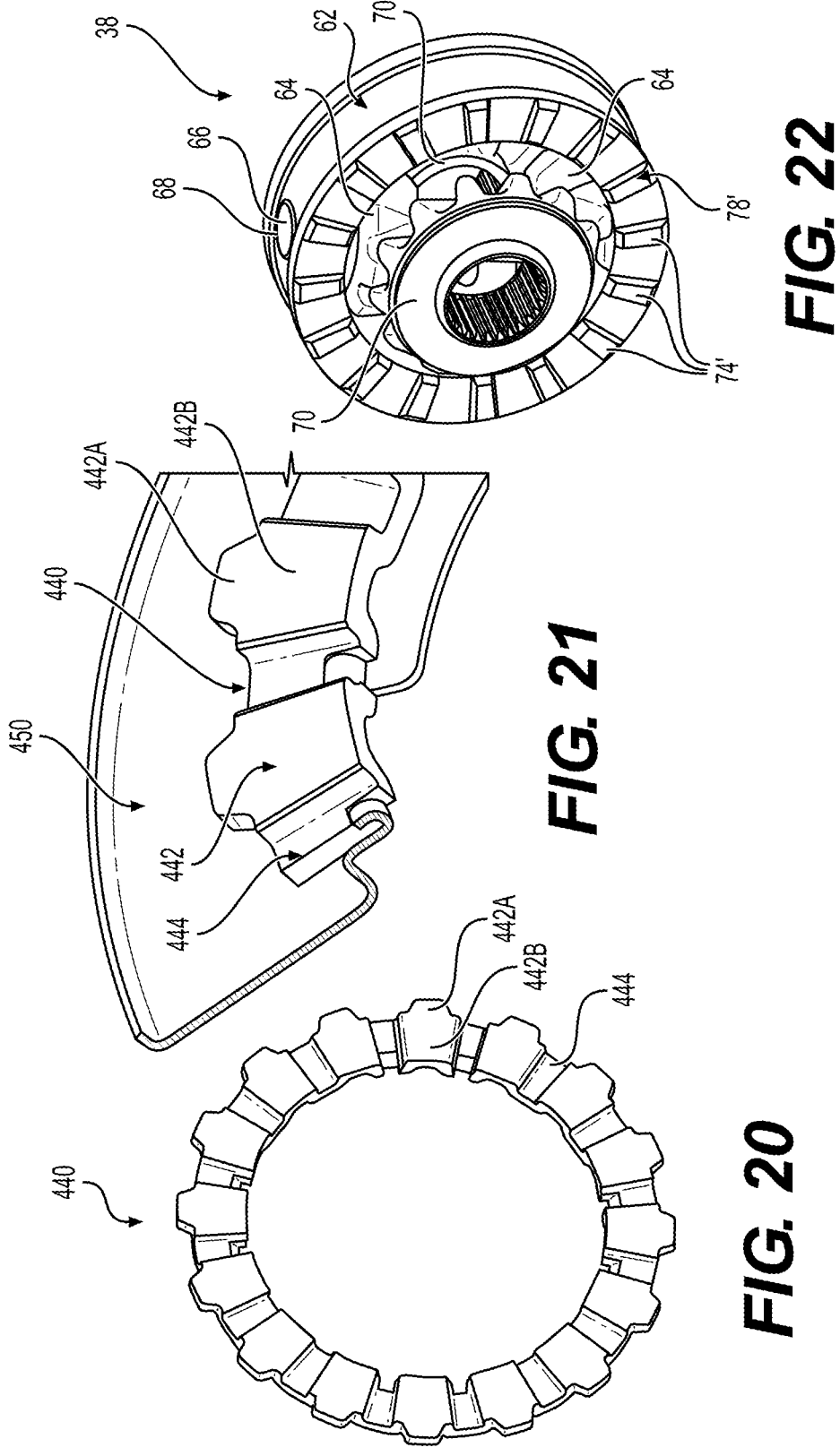
FIG. 20 is an isometric view of an axially-moveable dog clutch ring associated with the clutch unit shown in FIG. 19.
FIG. 21 is a partial isometric view of the dog clutch ring shown in FIG. 20 being fixedly secured to an actuation plate associate with the electromagnetic actuator unit shown in FIG. 19.
FIG. 22 is an isometric view of the differential mechanism and the axial face clutch plate configuration associated with the disconnectable differential assembly of FIG. 19.
Figures 23A, 23B, 24A, 24B:
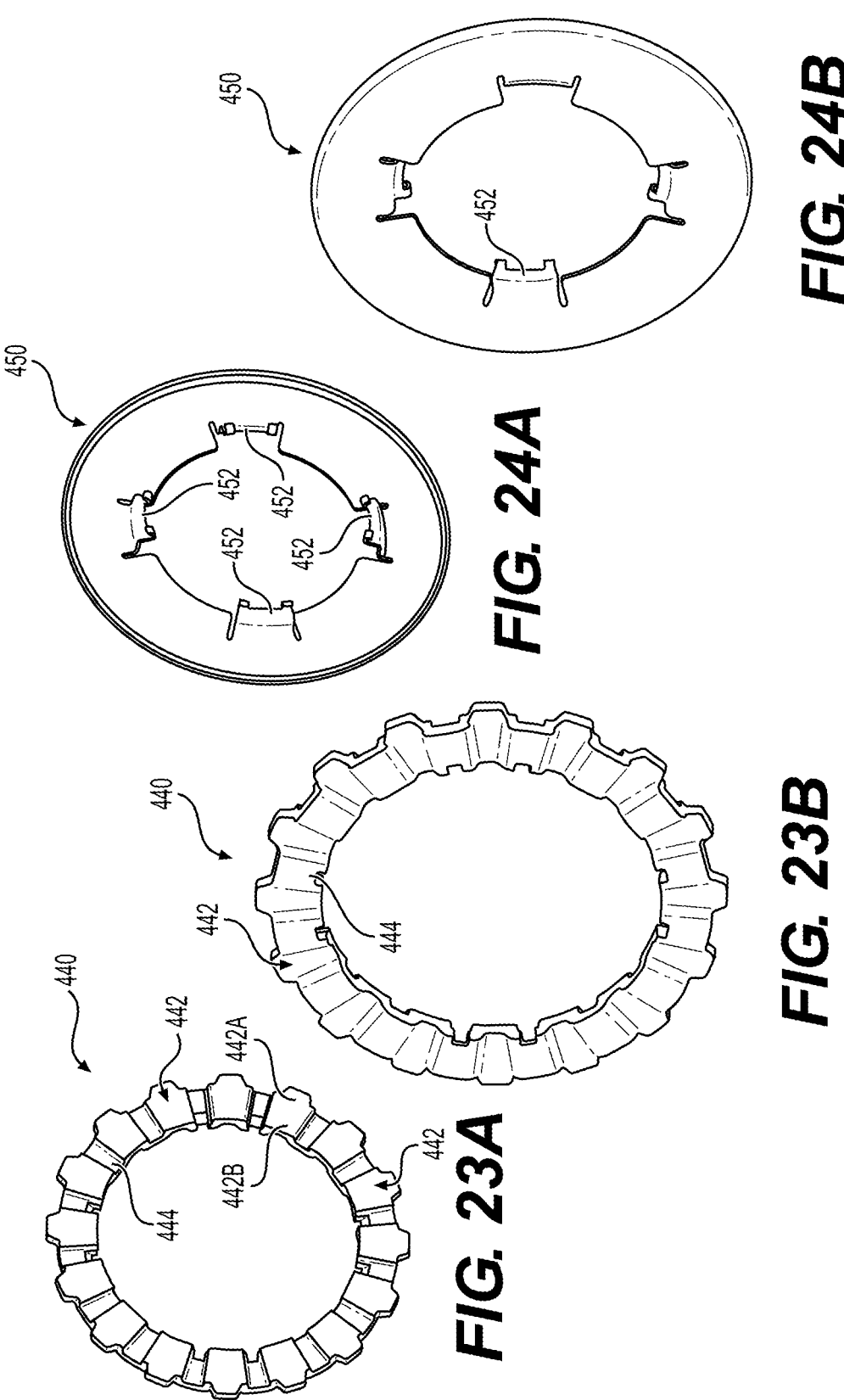
FIGS. 23A and 23B are front and back isometric views of the dog clutch ring associated with the clutch unit of FIG. 19.
FIGS. 24A and 24B are front and back isometric views of the actuation plate associated with the electromagnetic actuator unit shown in FIG. 19.
Figures 25A, 25B:
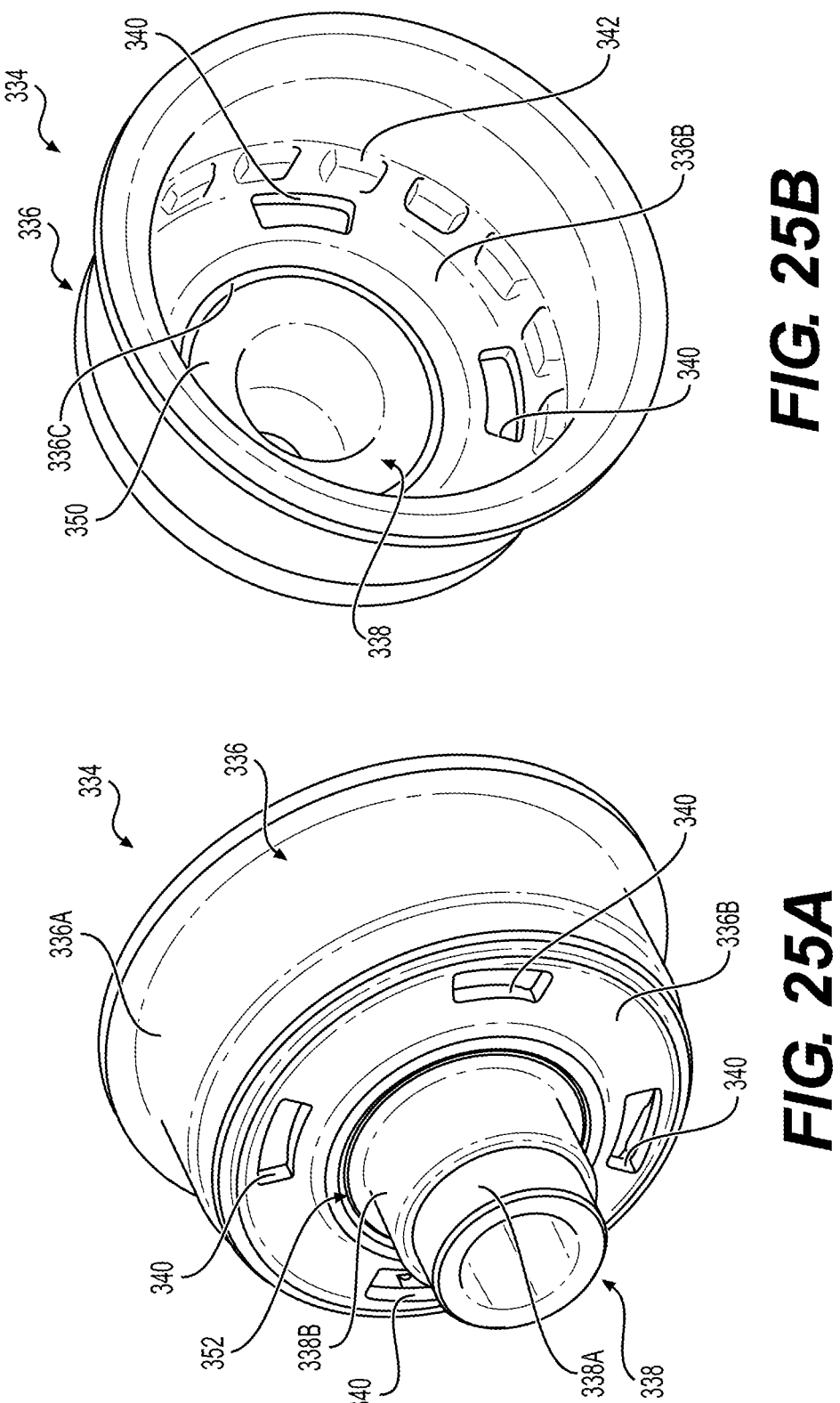
FIGS. 25A and 25B are isometric views of a two-piece outer housing unit associated with the power transfer mechanism of the disconnectable differential assembly of FIG. 19.
Figures 26A, 26B, 26C, 26D:
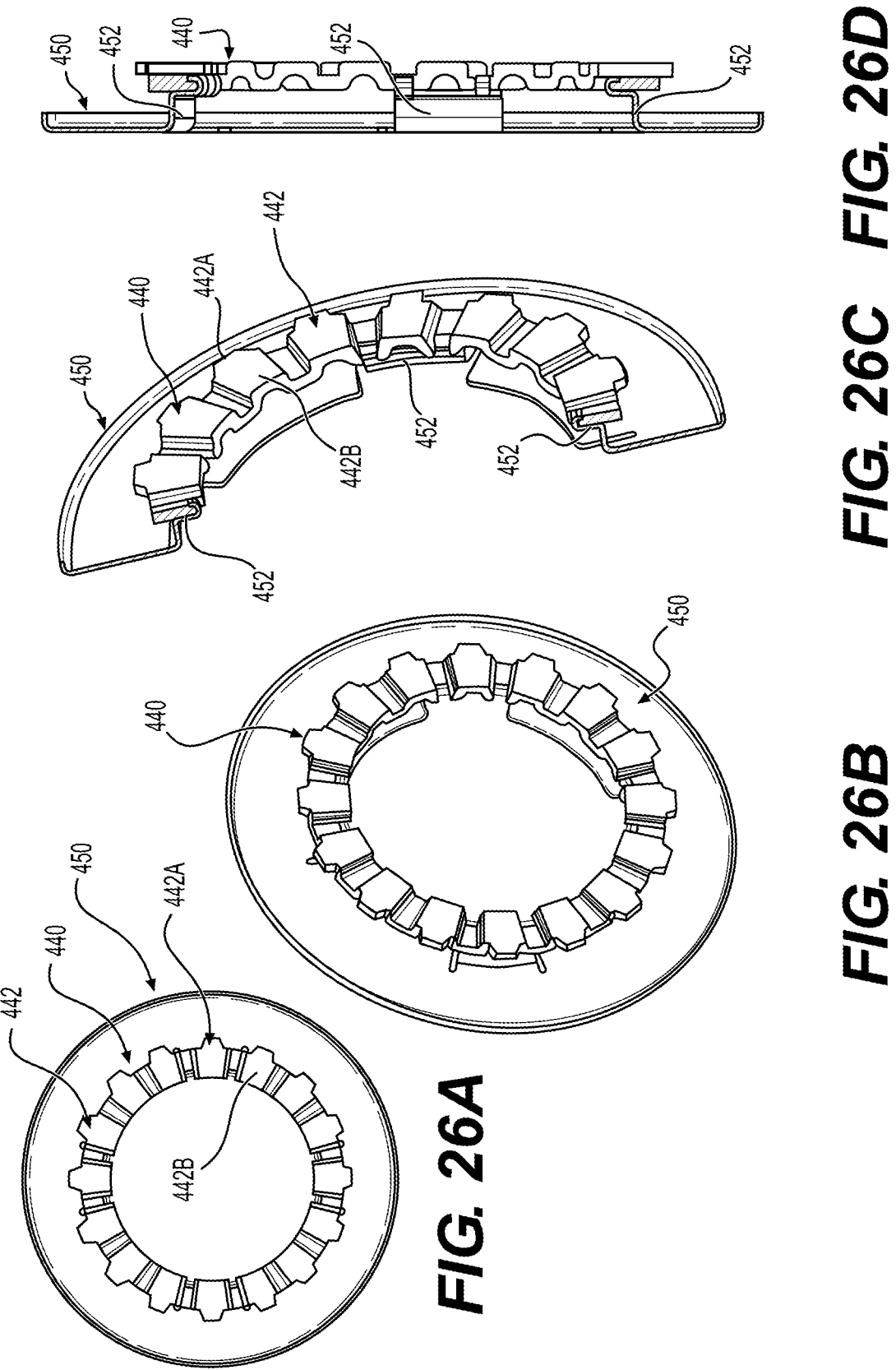
FIGS. 26A through 26D illustrate additional features of the dog clutch ring and the actuation member associated with the disconnectable differential assembly shown in FIG. 19.
Figures 27A, 27B, 27C, 27D:
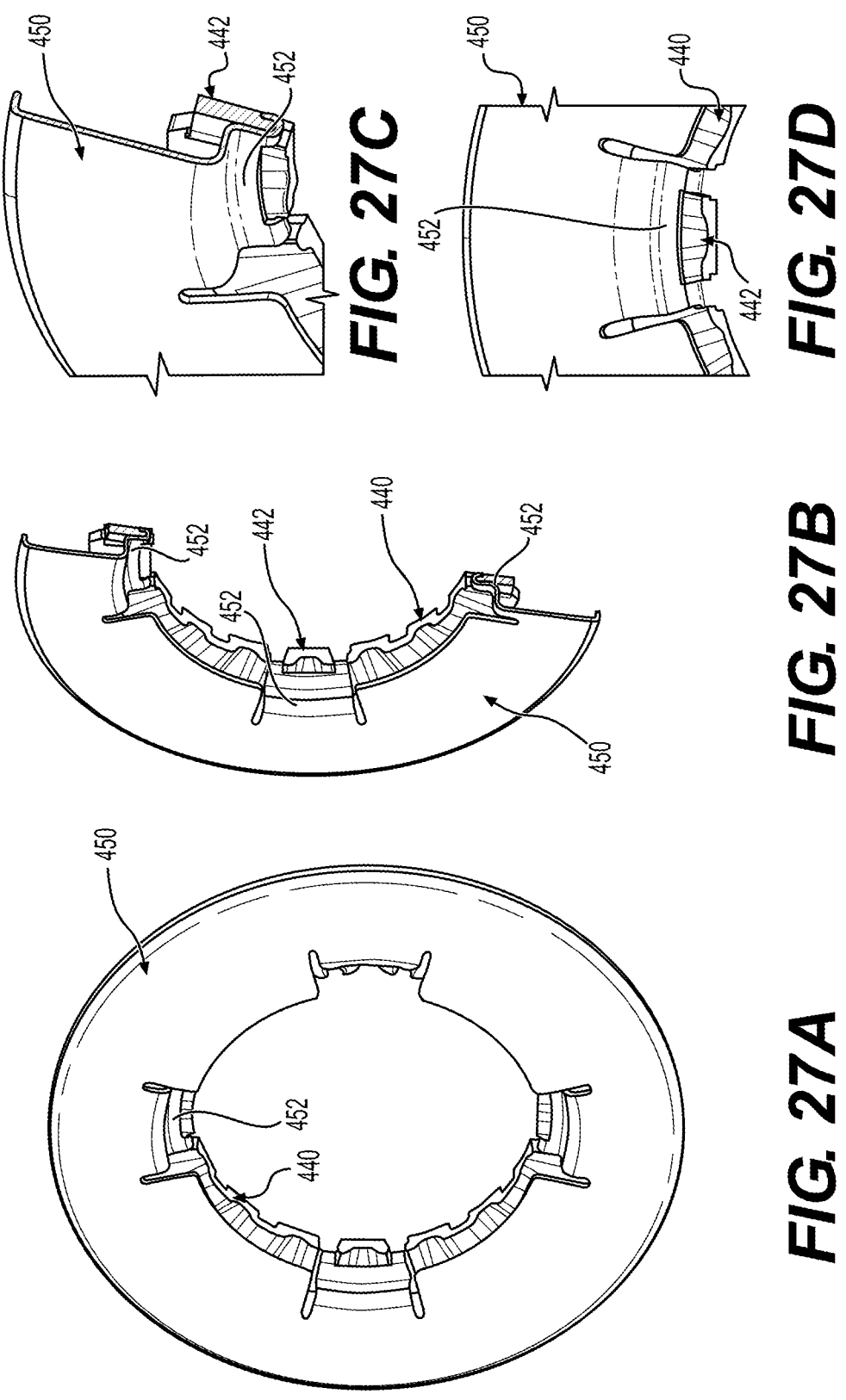
FIGS. 27A through 27D illustrate further features of the dog clutch ring and the actuation member associated with the disconnectable differential assembly shown in FIG. 19.

Clutch actuation unit 436 is configured to connect dog clutch plate 440 for concomitant axial movement with plunger 96 of electromagnetic actuator unit 80. To this end, FIG. 19 illustrates first actuation plate 116 latched to plunger 96, a modified second actuation plate 450 latched to dog plate ring 440, and thrust bearing 120 disposed therebetween. Second actuation plate 450 has a plurality of four (4) latch tabs 452 extending axially from a ring section 454 and which are oriented and aligned to extend through cut-outs 340 in outer housing 336. As best seen from FIG. 21 and FIGS. 26B-26D, latch tabs 452 engage portions of disc-plate 444 on opposite sides of drive lugs 442. Latch tabs 452 are crimped following installation of dog plate ring 440 to establish a fixed connection therebetween.

Figures 28, 29:
FIG. 28 is a partial sectional view illustrating a position sensing configuration associated with the electromagnetic actuator unit shown in FIG. 19.
FIG. 29 is a partial sectional view illustrating an alternative position sensing configuration associated with the electromagnetic actuator unit shown in FIG. 19.

Disconnect differential assembly 432 functions much like the previously disclosed embodiments with dog plate ring 440 normally located in its retracted position and plunger 96 located in its non-actuated position when electromagnetic clutch actuator unit 80 is operating in its power-off condition, whereby differential mechanism 38 is disconnected from power transfer mechanism 36 to establish the Disconnected mode. Energization of solenoid 92 causes plunger 96 to move to its actuated position such that clutch actuation unit 436 drives dog plate ring 442 to its extended position whereat dog portions 442B of drive lugs 442 are in engagement with clutch teeth 74' on face clutch plate 78' so as to establish the Connected mode. FIG. 28 illustrates a non-contact position sensor 500 located and functionally operable to sense the axial location of second actuation plate 118' for likewise sensing the position of dog plate ring 440 in either of its retracted and extended position. The position sense signal is delivered to controller 44 for use in controlling operation of disconnectable differential assembly 432. FIG. 29 illustrates use of a contact position sensor 500' engaging first actuation plate 116 (now including a radial extension) to again detect and signal the operational position of dog clutch sleeve 100 associated with disconnectable differential assembly 32.

Referring now to FIGS. 30A through 39 of the drawings, a sixth non-limiting embodiment of a disconnectable differential assembly 532 will now be described. In general, disconnectable differential assembly 532 is configured to include a modified clutch unit 534 and clutch actuation unit 536 used in conjunction with power transfer mechanism 36; differential mechanism 38, and a two-piece housing unit 334'. Disconnect mechanism 40' is also slightly modified to include electromagnetic actuator unit 80' having a solenoid coil 90', an annular clam-shell core housing 94', a plunger 96' and an actuation sleeve 540 on which plunger 96' is mounted. A free end of actuation sleeve 540 is maintained in constant, but non-fixed, engagement with first actuation plate 116A of clutch actuation unit 536. Thrust bearing 120 is again disposed between first actuation plate 116A and section actuation plate 118A. Second actuation plate 118A again includes a plurality of four (4) latching tabs 550 extending axially through cut-outs 340' in outer housing 334'.

Figures 31, 32:
FIG. 31 is a partial sectional view of the disconnectable differential assembly shown in FIGS. 30A-30C with its clutch unit in a released state in response to the electromagnetic actuator unit operating in a first or "power-off" condition.
FIG. 32 is similar to FIG. 31 except that the clutch unit is in an engaged state in response to the electromagnetic actuator unit operating in a second or "power-on" condition.
Figure 33B:
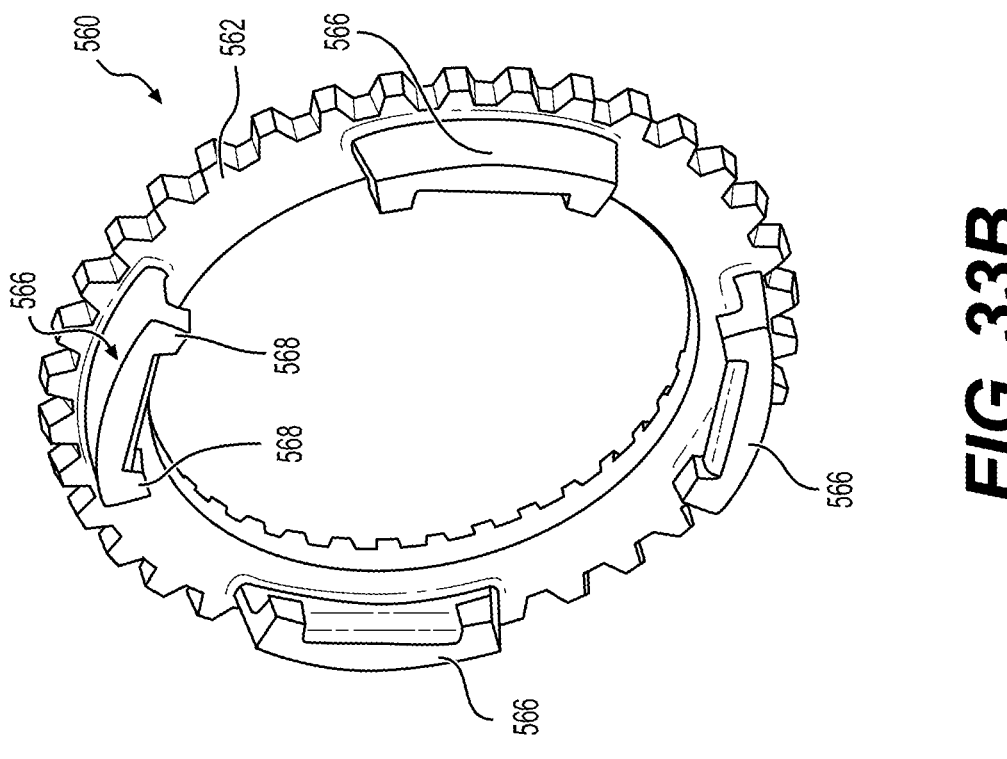
FIGS. 33A and 33B are isometric views of the dog clutch ring associated with the clutch unit of the disconnectable differential assembly shown in FIGS. 30A-30C.
Figure 33A:
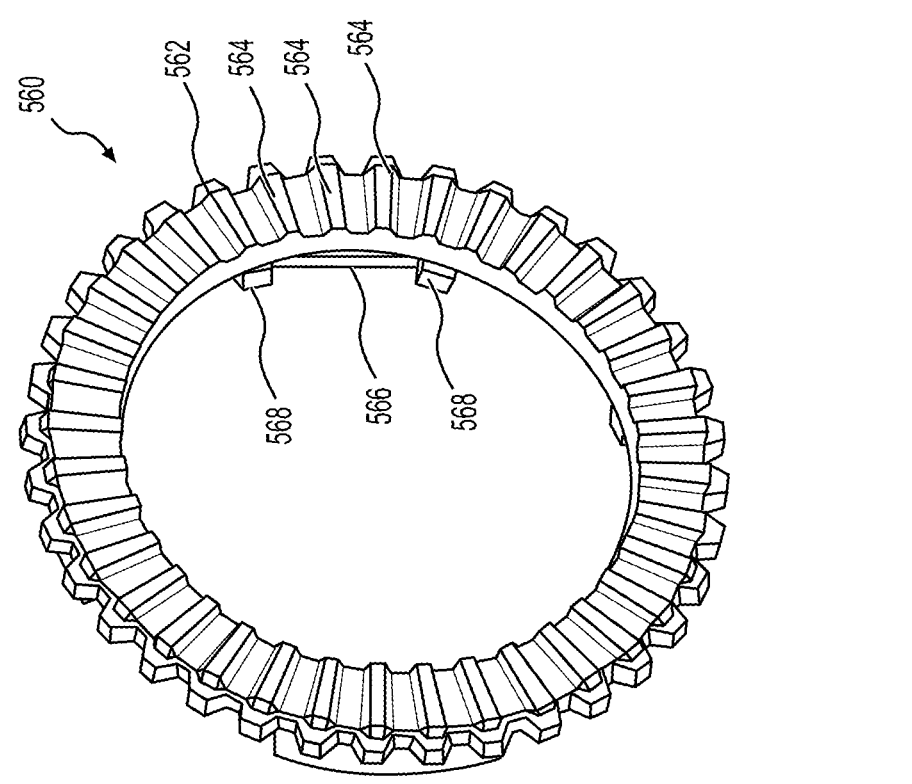
Figures 34A, 34B:
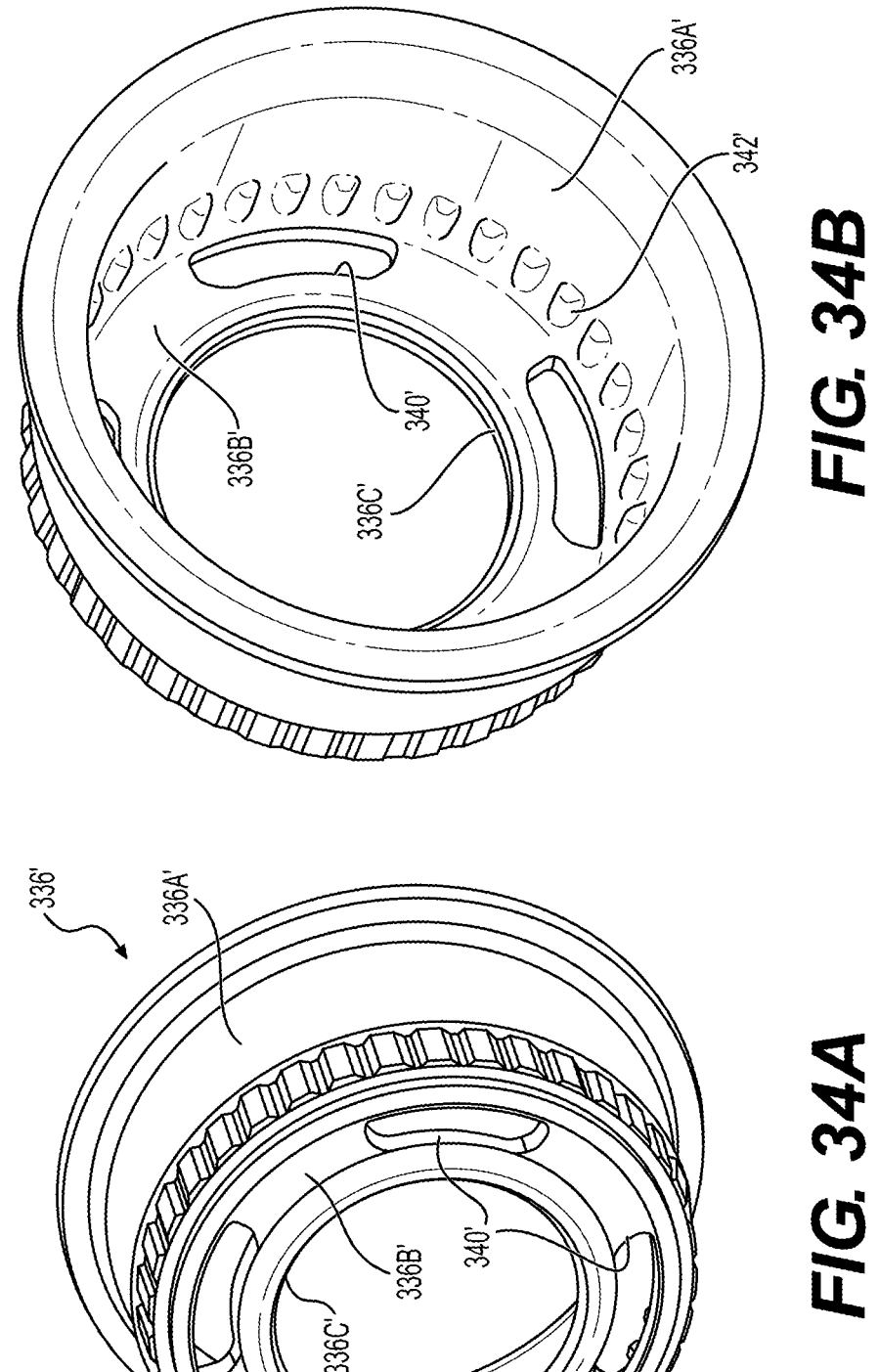
FIGS. 34A and 34B are isometric views of the outer housing associated with the power transfer mechanism of the disconnectable differential assembly shown in FIGS. 30A-30C.
Figure 36:
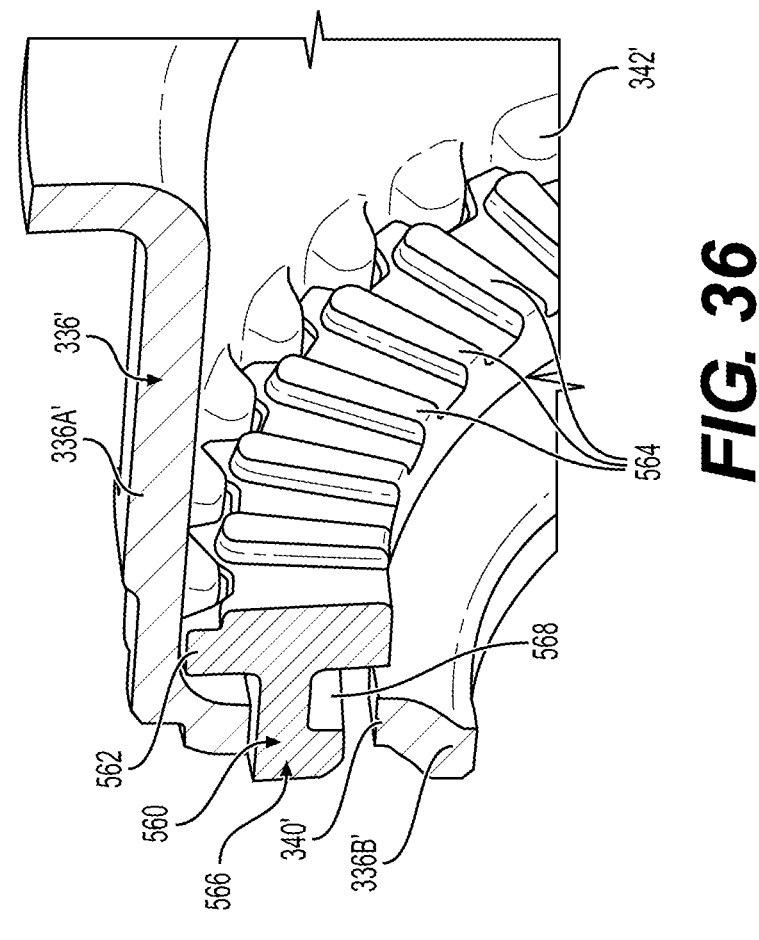
FIGS. 35 and 36 are partial isometric views illustrating the dog clutch ring of FIGS. 33A and 33B mounted to the outer housing of FIGS. 34A and 34B for common rotation and relative axial movement.
Figure 35:
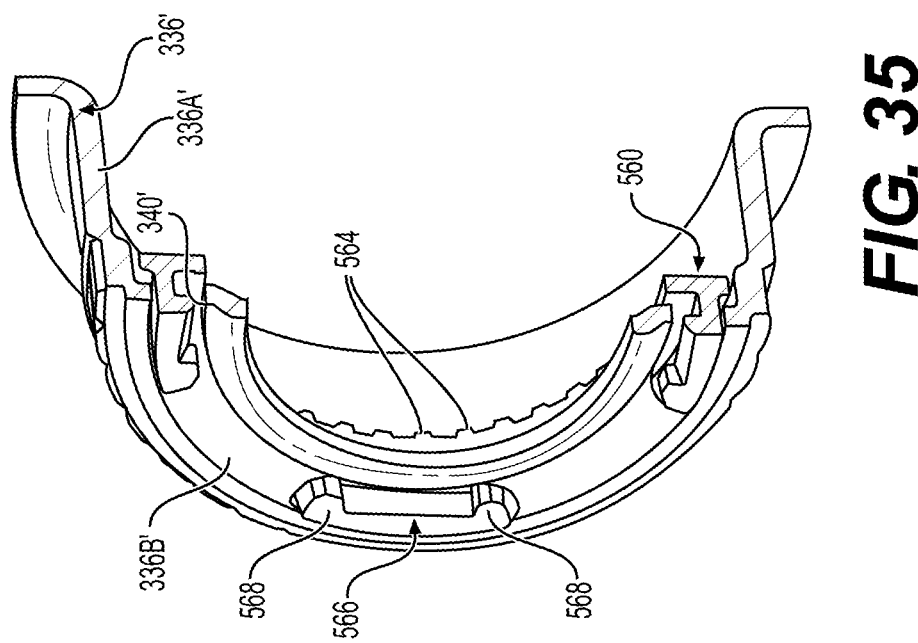
Figure 37:
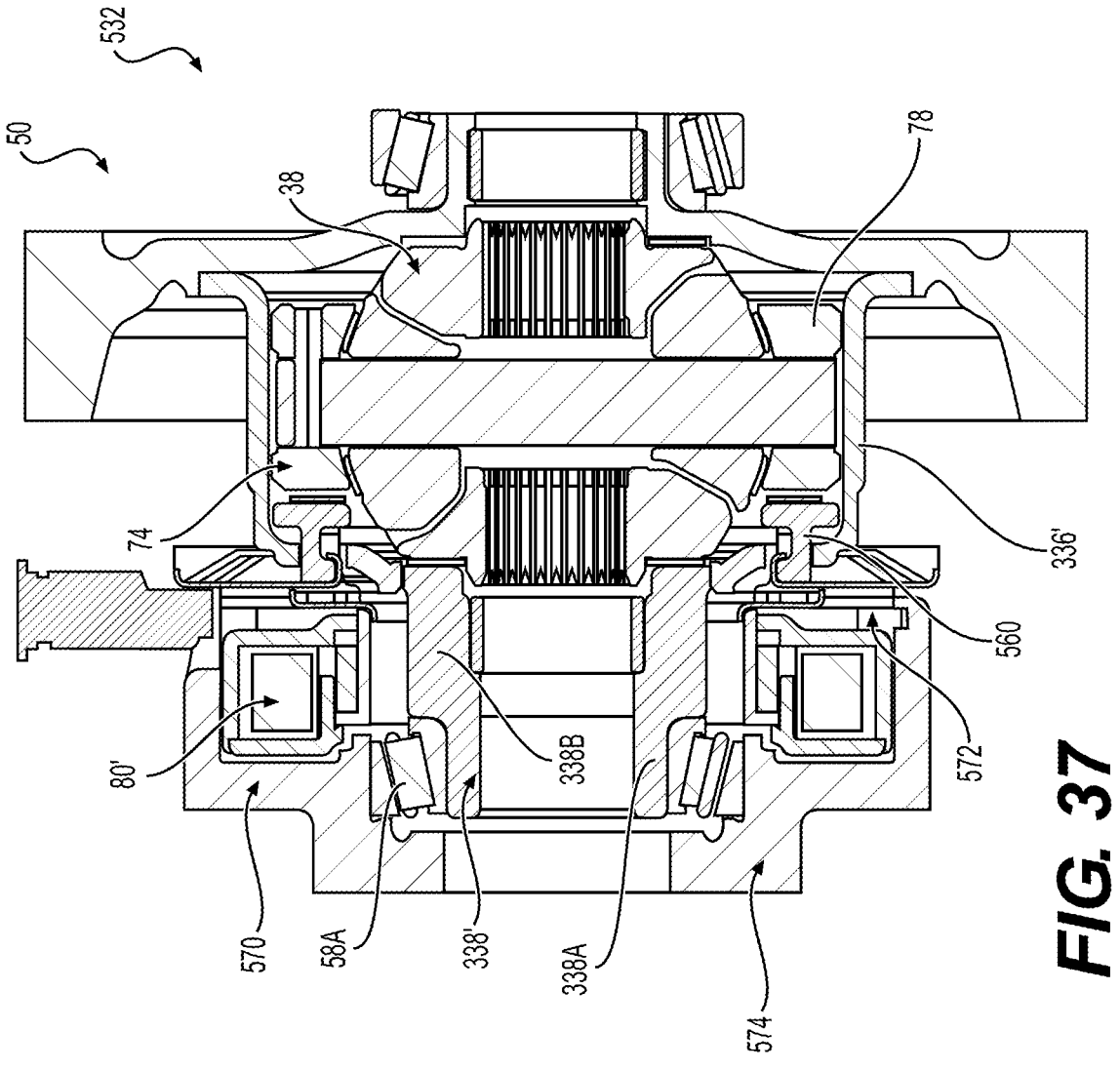
FIG. 37 is a full sectional view illustrating an alternative mounting arrangement for the electromagnetic actuator associated with the disconnectable differential assembly shown in FIGS. 30A-30C.

Clutch unit 534 is now configured to include a dog clutch ring 560 which, as best shown in FIGS. 33A and 33B, includes external radial splines 562, axial dog teeth 564, and a plurality of four pilot lugs 566 with latch tabs 568. External splines 562 are meshed with internal splines 342' within outer housing 334' while pilot lugs 566 are piloted within cut-outs 340'. Latching tabs 550 on second actuation plate 118A engage latch tabs 568 on pilot lugs 566, whereby clutch actuation mechanism 536 functions to cause movement of dog clutch ring 560 between its retracted position (FIG. 31) and its extended position (FIG. 32) in response to movement of plunger 96' between its non-actuated position (FIG. 31) and its actuated position (FIG. 32). Dog teeth 564 on clutch ring 560 are shown displaced from face clutch teeth 74 in the retracted position and engaged therewith in the extended position. FIGS. 35 and 36 best illustrate the "piloting" function provided by pilot lugs 556 of dog clutch rings 560 extending through similarly-shaped cut-outs 340' in outer housing 334', along with the meshed engagement of external splines 562 with internal splines 342'. FIG. 37 shows disconnectable differential assembly 532 with its solenoid unit 80' mounted via a shim 570 and a snap ring 572 in a housing 574 associated with the overall assembled device such as, for example, a transmission housing or an axle housing.

Figures 38, 39:
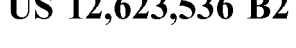
FIGS. 38 and 39 illustrate a tapered plunger configuration for use with the electromagnetic actuator units shown in FIGS. 30A-30C and 37.

With reference now to FIGS. 38 and 39, a tapered feature associate with plunger 96' of electromagnetic actuator unit 80' is shown in more detail for disconnect differential assembly 532. Note that a leading end portion 96A' is tapered, preferably in the range of 4"-10" relative to an overlapping portion of core housing 94A'. Note also that a trailing end portion 96B' of plunger 96' is in engagement with a radial flange portion 541 of actuation sleeve 540.

Figure 40:
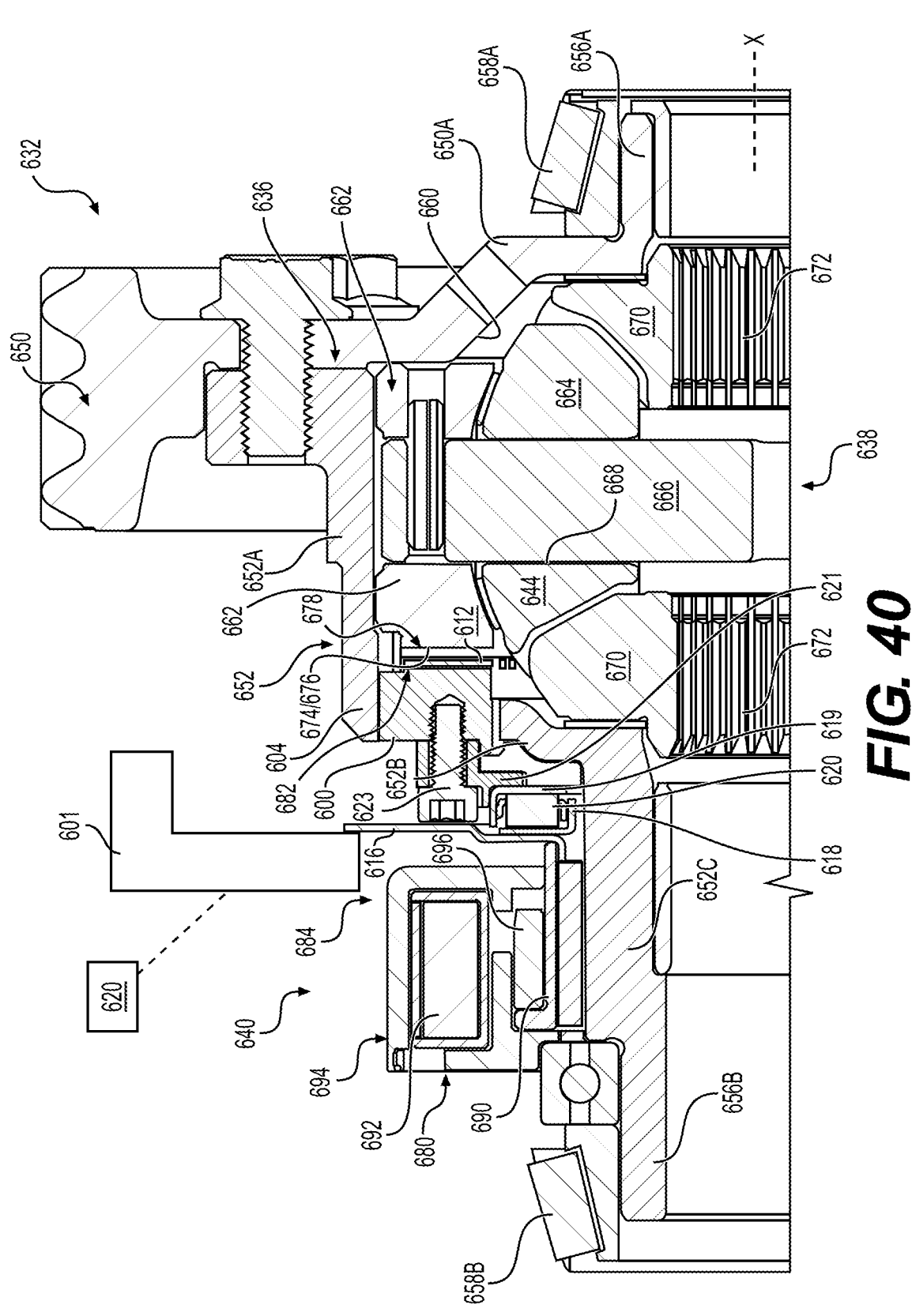
FIG. 40 is a partial sectional view of another, non-limiting, embodiment of a disconnectable differential assembly constructed in accordance with the teachings of the present disclosure.

Referring now to FIG. 40 of the drawings, a seventh non-limiting embodiment of a disconnect differential assembly 632 will be described. Again, common reference numerals are used in these drawings to identify components of disconnect differential assembly 632 that are similar in terms of structure and/or function to those previously described in association with the previously described disconnect differential assemblies. More particularly, FIG. 40 presents a power transfer mechanism 636 is generally shown to include a ring gear 650 and a bell-shaped outer housing 652 fixed to ring gear 650 for rotation about a common axis "X". Ring gear 650 is adapted to be driven by an output gear 54 (FIG. 1) of secondary electric motor 30. Ring gear 650 and outer housing 652 define a pair of laterally-spaced cylindrical bosses 656A, 656B upon which disconnect differential assembly 632 is rotatably supported in a housing (not shown) via a pair of laterally-spared bearing assemblies 658A, 658B. An axial hub section 652A and a radial ring section 652B of outer housing 652 cooperate with a plate portion 650A of ring gear 650 to define an internal cavity 660 within which differential mechanism 638 is supported for rotation about the "X" axis.

Differential mechanism 638 is shown to include a differential carrier 662, a pair of differential pinions 664 rotatably mounted on a pinion post 666 having its opposite ends secured in polar apertures 668 formed in differential carrier 662, and a pair of differential side gears 670 each meshed with both differential pinions 664. As is otherwise conventional, each differential side gear 670 has internal splines 672 configured to mesh with external splines formed on secondary axleshafts 34, whereby the output of differential mechanism 638 is drivingly connected to secondary wheels 18. Differential mechanism 638 is rotatably supported within internal cavity 660 of power transfer mechanism 636. A plurality axially-extending clutch teeth 674 are formed on an exterior end surface 676 of differential carrier 662 so as to define a first clutch member, configured as a face clutch 678.

Power-operated disconnect mechanism 640 is shown to generally include an electromagnetic actuator unit 680, a clutch unit 682 and a clutch actuation unit 684. Electromagnetic actuator unit 680 is annular in configuration and is oriented to surround an intermediate boss segment 652C of outer housing 652. Electromagnetic actuator unit 680 includes a solenoid 692, a clam-shell pole or core housing 694 encasing and surrounding solenoid 692, and a plunger 696 supported on an actuation sleeve 690 for axially-sliding movement. In addition to face clutch ring 678 on differential carrier 662, clutch unit 682 also includes a second clutch member, shown as an adjustable clutch sleeve 600, which is configured to rotate with outer housing 652 of power transfer mechanism 636 and moves axially with respect to face clutch ring 678. The adjustable clutch sleeve may include a plurality of externally-splined quadrants (e.g., like in FIG. 4) formed on an outer surface 604 of a sleeve portion of adjustable clutch sleeve 600. Furthermore, the axial section 652A of outer housing 652 may include a plurality of internally-splined quadrants for meshing with the externally-splined quadrants, whereby adjustable clutch sleeve 600 is coupled for common rotation with outer housing 652 but is capable of axial movement relative thereto. As with the sixth embodiment of FIGS. 30A to 39, the adjustable clutch sleeve 600 may include a plurality of pilot lugs that are piloted within cut-outs in the housing 652.

Clutch actuation unit 684 generally includes an apply plate, 616, a first actuation plate 618, a second actuation plate 619, a thrust bearing 620 located between the first and second actuation plates 618, 619 and a bearing plate 621. Apply plate 616 engages actuation sleeve 690. A biasing arrangement (not shown) is configured to bias the adjustable clutch sleeve 100 into a disconnected position in which it is spaced from the differential carrier 662. The bearing plate 621 is configured to engage and move the adjustable clutch sleeve 600 in response to associated movement of the apply plate 616 and actuation sleeve 690/plunger 696. A connecting element 623 extends through and connects the bearing plate 621 and the clutch sleeve 600.

In accordance with a preferred operational configuration, disconnect differential assembly 632 is normally operable in a disconnected mode when electromagnetic actuator unit 680 is operating in a "power-off" condition and can be shifted into a connected mode in response to electromagnetic actuator unit 680 being placed in a "power-on" condition. More specifically, clutch unit 682 is operating in a "released" state when the disconnected mode is established and is operating in an "engaged" state when the connected mode is established. The released state of clutch unit 682 is established when biasing arrangement locates clutch sleeve 600 in a retracted position whereat its dog teeth 612 are displaced from engagement with clutch teeth 674 on face clutch plate 678. Such axial movement of adjustable clutch sleeve 600 to its retracted position causes plunger 696 to be forcibly moved axially to a non-actuated position relative to solenoid 692 due to the interconnection established therebetween via clutch actuation unit 684. With dog plate clutch sleeve 600 located in its retracted position, differential carrier 662 is not drivingly connect with outer housing 652, whereby differential mechanism 38 is uncoupled from power transfer mechanism 636. As such, no drive torque is transmitted from secondary electric motor 630 through disconnectable differential assembly 632 to second wheels 618.

When it is desired to transmit torque from secondary electric motor 630 to secondary wheels 618, disconnect differential assembly 632 is shifted into its Connected mode by shifting electromagnetic actuator unit 680 into its power-on condition for energizing solenoid 692. The magnetic circuit generated upon energization of solenoid 692 causes magnetic plunger 696 to move axially from its non-actuated position into an actuated position which, in turn, causes dog plate clutch sleeve 600 to move from its retracted position into an extended position whereat its dog teeth 612 are engaged with clutch teeth 674 on face clutch plate 678. Such movement of plunger 696 to its actuated position and dog plate clutch sleeve 600 to its extended position, due to energization of solenoid 692, is in opposition to the biasing exerted thereon by the biasing element. With dog plate clutch sleeve 600 located and held in its extended position, differential carrier 662 is drivingly connected to outer housing 652, whereby differential mechanism 638 is coupled to power transfer mechanism 636. As such, drive torque generated by secondary electric motor 630 is transmitted from disconnectable differential assembly 632 to secondary wheels 618 to establish the 4WD mode. Additionally, regeneration of the power supply can be controlled via shifting disconnect differential assembly 632 into its Connected mode when secondary electric motor 630 is not transmitting torque via a regeneration control associated with control system 620.

A contact position sensor 601 is located and functionally operable to sense the axial location of the apply plate 616 for likewise sensing the position of the adjustable clutch sleeve 600 in either of its retracted and extended position. The position sense signal is delivered to controller 620 for use in controlling operation of disconnectable differential assembly 632.

Figure 41:
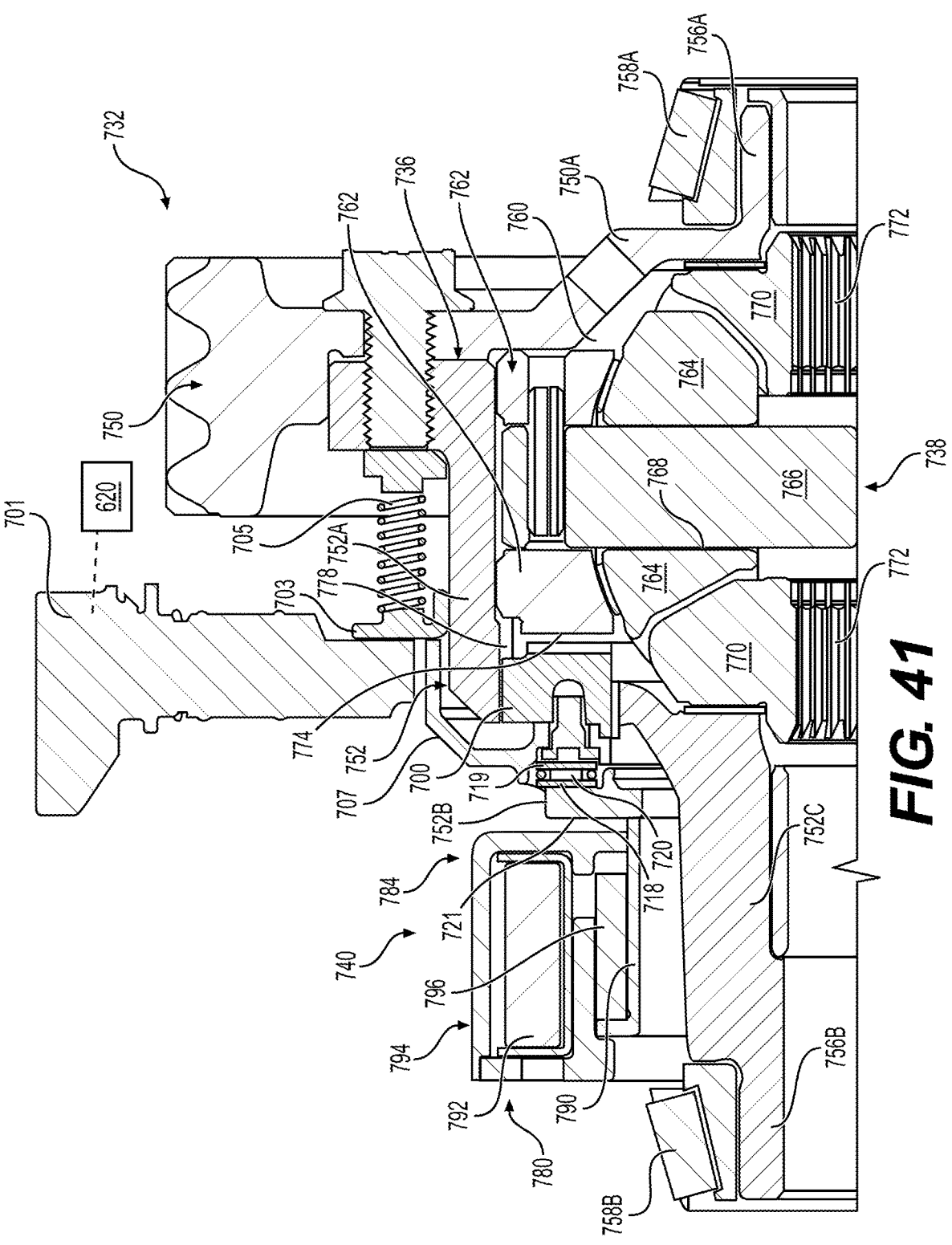
FIG. 41 is a partial sectional view of another, non-limiting, embodiment of a disconnectable differential assembly constructed in accordance with the teachings of the present disclosure.

Referring now to FIG. 41 of the drawings, an eighth non-limiting embodiment of a disconnect differential assembly 732 will be described. Again, common reference numerals are used in these drawings to identify components of disconnect differential assembly 732 that are similar in terms of structure and/or function to those previously described in association with the previously described disconnect differential assemblies. The disconnect differential assembly 732 is similar to the seventh embodiment, but instead of including a contact position sensor positioned against an apply plate, a contact sensor 701 engages a position sensor plate 703 that is located between the outer housing 752 and the contact sensor 701. A biasing element 705 biases the sensor plate 703 toward the contact sensor 701. The contact sensor 701 detects movement of the clutch sleeve 700 in response to a detection of associated movement of a translation plate 707 that moves with the clutch sleeve 700, and which engages the position sensor plate 703. Furthermore, instead of engaging an apply plate 616, the actuation sleeve 790 directly engages a thrust plate 721 to ultimately provide movement to the clutch sleeve 700. Furthermore, the translation plate 707 is located between the thrust plate 721 and the clutch sleeve 700 and extends over the outer housing 752 into engagement with the position sensor plate 703

Example embodiments of disconnectable differential assemblies of the type configured for use in electrically-powered vehicle powertrains are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A disconnectable differential assembly for a vehicle, comprising:
   a power transfer mechanism driven by an electric motor;
   a differential mechanism drivingly connected to a pair of ground-engaging wheels;
   a power-operated disconnect mechanism operable in a disconnected mode to uncouple the power transfer mechanism from the differential mechanism and in a connected mode to couple the power transfer mechanism to the differential mechanism; and
   a control system for controlling operation of the electric motor and the power-operated disconnect mechanism;
   wherein the power transfer mechanism includes a ring gear driven by the electric motor and an outer housing fixed to the ring gear to define an internal cavity, wherein the differential mechanism is rotatably supported within the internal cavity and includes a differential carrier and a gearset driven by the differential carrier, and wherein the power-operated disconnect mechanism includes a clutch unit operably disposed between the outer housing and the differential carrier and an electromagnetic actuator unit operable for shifting the clutch unit between a released state whereat the disconnect mode is established and an engaged state whereat the connected mode is established;
   wherein the clutch unit includes a first clutch member associated with the differential carrier and having clutch teeth, and a second clutch member having dog teeth and being coupled for common rotation with the outer housing and axially moveable relative to the differential carrier between retracted and extended positions, the clutch unit being operable in its released state when the second clutch member is located in its retracted position such that its dog teeth are disengaged from the clutch teeth and further operable in its engaged state when the second clutch member is located in its extended position such that its dog teeth are engaged with the clutch teeth, and wherein the clutch unit further includes a biasing arrangement for normally biasing the second clutch member towards its retracted position;
   a clutch actuation mechanism operably arranged to interconnect the second clutch member to a moveable actuation component of the electromagnetic actuator unit, wherein the actuation component is located in a non-actuated position when the electromagnetic actuator unit is operating in a power-off condition and is located in an actuated position when the electromagnetic actuator unit is operating in a power-on condition, and wherein the clutch actuation mechanism is operable to move the second clutch member between its retracted and extended positions in response to movement of the actuation component between its non-actuated and actuated positions;
   wherein the first clutch member is a face clutch with its clutch teeth extending axially from the differential carrier, wherein the second clutch member is a dog plate component coupled via a splined connection to the outer housing and having a dog plate portion formed with axially-extending dog teeth, wherein the clutch actuation mechanism includes a first actuation plate latched to the actuation component, a second actuation plate having tabs extending through cut-outs in the outer housing and engaging the dog plate component, and a thrust bearing disposed between the first and second actuation plates.

2. The disconnectable differential assembly of claim 1, wherein the electromagnetic actuator unit is an annular device including an annular solenoid coil substantially encased within an annular pole housing, and wherein the actuation component is an annular plunger configured to be located in its non-actuated position when the solenoid coil is non-energized and to be located in its actuated position when the solenoid coil is energized.

3. The disconnectable differential assembly of claim 1, wherein the second clutch member includes a plurality of externally-splined spaced apart sections in constant meshed engagement with a plurality of internally-splined spaced apart sections formed in the outer housing and which are aligned with the cut-outs.

4. A disconnectable differential assembly for a vehicle, comprising:
   a power transfer mechanism driven by an electric motor;
   a differential mechanism drivingly connected to a pair of ground-engaging wheels;
   a power-operated disconnect mechanism operable in a disconnected mode to uncouple the power transfer mechanism from the differential mechanism and in a connected mode to couple the power transfer mechanism to the differential mechanism; and
   a control system for controlling operation of the electric motor and the power-operated disconnect mechanism;
   wherein the power transfer mechanism includes a ring gear driven by the electric motor and an outer housing fixed to the ring gear to define an internal cavity, wherein the differential mechanism is rotatably supported within the internal cavity and includes a differential carrier and a gearset driven by the differential carrier, and wherein the power-operated disconnect mechanism includes a clutch unit operably disposed between the outer housing and the differential carrier and an electromagnetic actuator unit operable for shifting the clutch unit between a released state whereat the disconnect mode is established and an engaged state whereat the connected mode is established;

wherein the clutch unit includes a first clutch member associated with the differential carrier and having clutch teeth, and a second clutch member having dog teeth and being coupled for common rotation with the outer housing and axially moveable relative to the differential carrier between retracted and extended positions, the clutch unit being operable in its released state when the second clutch member is located in its retracted position such that its dog teeth are disengaged from the clutch teeth and further operable in its engaged state when the second clutch member is located in its extended position such that its dog teeth are engaged with the clutch teeth, and wherein the clutch unit further includes a biasing arrangement for normally biasing the second clutch member towards its retracted position;

a clutch actuation mechanism operably arranged to interconnect the second clutch member to a moveable actuation component of the electromagnetic actuator unit, wherein the actuation component is located in a non-actuated position when the electromagnetic actuator unit is operating in a power-off condition and is located in an actuated position when the electromagnetic actuator unit is operating in a power-on condition, and wherein the clutch actuation mechanism is operable to move the second clutch member between its retracted and extended positions in response to movement of the actuation component between its non-actuated and actuated positions;

wherein the first clutch member includes a radial clutch ring with clutch teeth extending radially outwardly from the differential carrier, wherein the second clutch member is a radial clutch sleeve having a cylindrical sleeve portion coupled via a splined connection to the outer housing and a dog ring portion having dog teeth extending radially inwardly from within the sleeve portion, wherein the clutch actuation mechanism includes a first actuation plate latched to the actuation component, a second actuation plate having tabs extending axially through cut-outs in the outer housing and engaging the sleeve portion of the radial clutch sleeve, and a thrust bearing disposed between the first and second actuation plates.

5. The disconnectable differential assembly of claim 4, wherein the sleeve portion of the radial clutch sleeve includes external splines that are in constant meshed engagement with internal splines formed within the outer housing, wherein the radial clutch ring is formed on the differential carrier and its clutch teeth define axially-aligned first and second clutch teeth that are separated by a non-toothed channel, and wherein the dog teeth are formed in the sleeve portion of the radial clutch sleeve and define axially-aligned first and second dog teeth separated by a non-toothed gap, the first and second dog teeth are disengaged from corresponding first and second clutch teeth when the radial clutch sleeve is located in its retracted position to uncouple the differential carrier from the outer housing and the first and second dog teeth are engaged with corresponding first and second clutch teeth when the radial clutch sleeve is located in its extended position.

6. The disconnectable differential assembly of claim 4, wherein four quadrants of the external splines are formed on an outer surface of the sleeve portion of the radial clutch sleeve, wherein four quadrants of internal splines are formed on an inner surface of the outer housing which are aligned with the cut-outs.

7. A disconnectable differential assembly for a vehicle, comprising:

a power transfer mechanism driven by an electric motor;

a differential mechanism drivingly connected to a pair of ground-engaging wheels;

a power-operated disconnect mechanism operable in a disconnected mode to uncouple the power transfer mechanism from the differential mechanism and in a connected mode to couple the power transfer mechanism to the differential mechanism; and a control system for controlling operation of the electric motor and the power-operated disconnect mechanism;

wherein the power transfer mechanism includes a ring gear driven by the electric motor and an outer housing fixed to the ring gear to define an internal cavity, wherein the differential mechanism is rotatably supported within the internal cavity and includes a differential carrier and a gearset driven by the differential carrier, and wherein the power-operated disconnect mechanism includes a clutch unit operably disposed between the outer housing and the differential carrier and an electromagnetic actuator unit operable for shifting the clutch unit between a released state whereat the disconnect mode is established and an engaged state whereat the connected mode is established;

wherein the clutch unit includes a first clutch member associated with the differential carrier and having clutch teeth, and a second clutch member having dog teeth and being coupled for common rotation with the outer housing and axially moveable relative to the differential carrier between retracted and extended positions, the clutch unit being operable in its released state when the second clutch member is located in its retracted position such that its dog teeth are disengaged from the clutch teeth and further operable in its engaged state when the second clutch member is located in its extended position such that its dog teeth are engaged with the clutch teeth, and wherein the clutch unit further includes a biasing arrangement for normally biasing the second clutch member towards its retracted position;

a clutch actuation mechanism operably arranged to interconnect the second clutch member to a moveable actuation component of the electromagnetic actuator unit, wherein the actuation component is located in a non-actuated position when the electromagnetic actuator unit is operating in a power-off condition and is located in an actuated position when the electromagnetic actuator unit is operating in a power-on condition, and wherein the clutch actuation mechanism is operable to move the second clutch member between its retracted and extended positions in response to movement of the actuation component between its non-actuated and actuated positions;

wherein the first clutch member is a face clutch formed on the differential carrier and having axially extending clutch teeth, wherein the second clutch member is a dog plate ring having a dog plate portion with axially extending dog teeth, a plurality of drive lugs extending axially from the dog plate portion, and a latch flange extending from each of the drive lugs, wherein the dog plate portion is located within the internal cavity, the drive lugs pass through cut-outs formed in the outer housing, and the latch flanges extend outside of the outer housing, wherein the clutch actuation mechanism includes a first actuation plate latched to the actuation component, a second actuation plate latched to the latch flanges of the dog plate ring, and a thrust bearing disposed between the first and second actuation plates.

8. The disconnectable differential assembly of claim 7, wherein the drive lugs include external splines configured to be in constant meshed engagement with internal splines formed in the cut-outs of the outer housing.

9. A disconnectable differential assembly for a vehicle, comprising:

a power transfer mechanism driven by an electric motor;

a differential mechanism drivingly connected to a pair of ground-engaging wheels;

a power-operated disconnect mechanism operable in a disconnected mode to uncouple the power transfer mechanism from the differential mechanism and in a connected mode to couple the power transfer mechanism to the differential mechanism; and a control system for controlling operation of the electric motor and the power-operated disconnect mechanism;

wherein the power transfer mechanism includes a ring gear driven by the electric motor and an outer housing fixed to the ring gear to define an internal cavity, wherein the differential mechanism is rotatably supported within the internal cavity and includes a differential carrier and a gearset driven by the differential carrier, and wherein the power-operated disconnect mechanism includes a clutch unit operably disposed between the outer housing and the differential carrier and an electromagnetic actuator unit operable for shifting the clutch unit between a released state whereat the disconnect mode is established and an engaged state whereat the connected mode is established;

wherein the clutch unit includes a first clutch member associated with the differential carrier and having clutch teeth, and a second clutch member having dog teeth and being coupled for common rotation with the outer housing and axially moveable relative to the differential carrier between retracted and extended positions, the clutch unit being operable in its released state when the second clutch member is located in its retracted position such that its dog teeth are disengaged from the clutch teeth and further operable in its engaged state when the second clutch member is located in its extended position such that its dog teeth are engaged with the clutch teeth, and wherein the clutch unit further includes a biasing arrangement for normally biasing the second clutch member towards its retracted position;

a clutch actuation mechanism operably arranged to interconnect the second clutch member to a moveable actuation component of the electromagnetic actuator unit, wherein the actuation component is located in a non-actuated position when the electromagnetic actuator unit is operating in a power-off condition and is located in an actuated position when the electromagnetic actuator unit is operating in a power-on condition, and wherein the clutch actuation mechanism is operable to move the second clutch member between its retracted and extended positions in response to movement of the actuation component between its non-actuated and actuated positions;

wherein the first clutch member is a face clutch associated with the differential carrier and having axially-extending clutch teeth, wherein the second clutch member is a dog plate ring having external radially-extending spline teeth and axially-extending dog teeth commonly formed on drive portions connected by adjacent web portions, wherein the clutch actuation mechanism includes a first actuation plate latched to the actuation component, a second actuation plate having axially-extending drive flanges passing through cut-outs formed in the outer housing and which are in engagement with the web portions of the dog plate ring, and a thrust bearing disposed between the first and second actuation plates.

10. The disconnectable differential assembly of claim 9, wherein the external radial splines on the drive portions of the dog plate ring are in constant meshed engagement with internal splines formed on the outer housing within the internal cavity.

11. The disconnectable differential assembly of claim 9, wherein the drive flanges on the second actuation plate include latch flanges that are latched to the web portions of the dog plate ring via a crimped connection.

12. A disconnectable differential assembly for a vehicle, comprising:

a power transfer mechanism driven by an electric motor;

a differential mechanism drivingly connected to a pair of ground-engaging wheels;

a power-operated disconnect mechanism operable in a disconnected mode to uncouple the power transfer mechanism from the differential mechanism and in a connected mode to couple the power transfer mechanism to the differential mechanism; and a control system for controlling operation of the electric motor and the power-operated disconnect mechanism;

wherein the power transfer mechanism includes a ring gear driven by the electric motor and an outer housing fixed to the ring gear to define an internal cavity, wherein the differential mechanism is rotatably supported within the internal cavity and includes a differential carrier and a gearset driven by the differential carrier, and wherein the power-operated disconnect mechanism includes a clutch unit operably disposed between the outer housing and the differential carrier and an electromagnetic actuator unit operable for shifting the clutch unit between a released state whereat the disconnect mode is established and an engaged state whereat the connected mode is established;

wherein the clutch unit includes a first clutch member associated with the differential carrier and having clutch teeth, and a second clutch member having dog teeth and being coupled for common rotation with the outer housing and axially moveable relative to the differential carrier between retracted and extended positions, the clutch unit being operable in its released state when the second clutch member is located in its retracted position such that its dog teeth are disengaged from the clutch teeth and further operable in its engaged state when the second clutch member is located in its extended position such that its dog teeth are engaged with the clutch teeth, and wherein the clutch unit further includes a biasing arrangement for normally biasing the second clutch member towards its retracted position;

a clutch actuation mechanism operably arranged to interconnect the second clutch member to a moveable actuation component of the electromagnetic actuator unit, wherein the actuation component is located in a non-actuated position when the electromagnetic actuator unit is operating in a power-off condition and is located in an actuated position when the electromagnetic actuator unit is operating in a power-on condition, and wherein the clutch actuation mechanism is operable to move the second clutch member between its retracted and extended positions in response to movement of the actuation component between its non-actuated and actuated positions;

wherein the electromagnetic actuator unit is an annular device including an annular solenoid coil substantially encased within an annular pole housing, and wherein the actuation component is an annular plunger configured to be located in its non-actuated position when the solenoid coil is non-energized and to be located in its actuated position when the solenoid coil is energized;

wherein the clutch actuation mechanism further includes an actuation sleeve upon which the annular plunger is mounted, and wherein a first actuation plate of the clutch actuation mechanism engages an end of the actuation sleeve, wherein the clutch actuation mechanism further includes a second actuation plate and a thrust bearing disposed between the first and second actuation plates, wherein the second actuation plate is rotatable relative to the first actuation plate.

13. A disconnectable differential assembly for a vehicle, comprising:

a power transfer mechanism driven by an electric motor;

a differential mechanism drivingly connected to a pair of ground-engaging wheels;

a power-operated disconnect mechanism operable in a disconnected mode to uncouple the power transfer mechanism from the differential mechanism and in a connected mode to couple the power transfer mechanism to the differential mechanism; and a control system for controlling operation of the electric motor and the power-operated disconnect mechanism;

wherein the power transfer mechanism includes a ring gear driven by the electric motor and an outer housing fixed to the ring gear to define an internal cavity, wherein the differential mechanism is rotatably supported within the internal cavity and includes a differential carrier and a gearset driven by the differential carrier, and wherein the power-operated disconnect mechanism includes a clutch unit operably disposed between the outer housing and the differential carrier and an electromagnetic actuator unit operable for shifting the clutch unit between a released state whereat the disconnect mode is established and an engaged state whereat the connected mode is established;

wherein the clutch unit includes a first clutch member associated with the differential carrier and having clutch teeth, and a second clutch member having dog teeth and being coupled for common rotation with the outer housing and axially moveable relative to the differential carrier between retracted and extended positions, the clutch unit being operable in its released state when the second clutch member is located in its retracted position such that its dog teeth are disengaged from the clutch teeth and further operable in its engaged state when the second clutch member is located in its extended position such that its dog teeth are engaged with the clutch teeth, and wherein the clutch unit further includes a biasing arrangement for normally biasing the second clutch member towards its retracted position;

a clutch actuation mechanism operably arranged to interconnect the second clutch member to a moveable actuation component of the electromagnetic actuator unit, wherein the actuation component is located in a non-actuated position when the electromagnetic actuator unit is operating in a power-off condition and is located in an actuated position when the electromagnetic actuator unit is operating in a power-on condition, and wherein the clutch actuation mechanism is operable to move the second clutch member between its retracted and extended positions in response to movement of the actuation component between its non-actuated and actuated positions;

wherein the electromagnetic actuator unit is an annular device including an annular solenoid coil substantially encased within an annular pole housing, and wherein the actuation component is an annular plunger configured to be located in its non-actuated position when the solenoid coil is non-energized and to be located in its actuated position when the solenoid coil is energized;

wherein the annular plunger has a tapered leading outer surface configured to overly a non-tapered shoulder portion of the pole housing during movement of the plunger between its non-actuated and actuated positions.

14. The disconnectable differential assembly of claim 7, wherein the electric motor and the disconnectable differential assembly define an electric drive axle for an electric vehicle.

15. The disconnectable differential assembly of claim 14, wherein the electric drive axle is adapted for installation as the secondary electric powertrain in an electric vehicle to provide a four-wheel drive arrangement.

16. The disconnectable differential assembly of claim 1, wherein the dog plate component comprises a dog plate clutch sleeve having a cylindrical sleeve portion coupled via the splined connection to the outer housing.

17. The disconnectable differential assembly of claim 7, wherein a biasing arrangement is disposed between the second actuation plate and a ring portion of the outer housing, wherein the biasing arrangement biases the dog plate ring away from the face clutch and, via the clutch actuation unit, biases the actuation component toward its non-actuated position.

18. The disconnectable differential assembly of claim 17, wherein the second actuation plate includes a plurality of locking flanges that engage the drive lugs on opposite sides of the latch flanges, wherein the biasing arrangement biases the second actuation plate away from the ring portion of the outer housing, thereby biasing the dog plate ring away from the face clutch.

19. The disconnectable differential assembly of claim 7, wherein the dog plate ring includes external splines configured to be in constant meshed engagement with internal splines formed within the outer housing.

* * * * *